(12) United States Patent
Osadchyy

(10) Patent No.: US 9,582,225 B2
(45) Date of Patent: Feb. 28, 2017

(54) DOCUMENT SOLUTION MANAGEMENT PLATFORM IN A DECENTRALIZED ENVIRONMENT

(71) Applicant: KYOCERA Document Solutions Inc., Osaka (JP)

(72) Inventor: Oleksandr Osadchyy, Concord, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/671,316

(22) Filed: Mar. 27, 2015

(65) Prior Publication Data
US 2016/0283168 A1 Sep. 29, 2016

(51) Int. Cl.
*G06F 3/12* (2006.01)

(52) U.S. Cl.
CPC .......... *G06F 3/1205* (2013.01); *G06F 3/1253* (2013.01); *G06F 3/1288* (2013.01)

(58) Field of Classification Search
USPC .......... 235/379, 380; 705/30; 358/1.15, 1.16
See application file for complete search history.

(56) References Cited

U.S. PATENT DOCUMENTS

| | | | |
|---|---|---|---|
| 8,099,472 B2 | 1/2012 | Mahaffey et al. | |
| 2007/0046994 A1* | 3/2007 | Morales | G06F 3/1204 358/1.16 |
| 2008/0250385 A1 | 10/2008 | Sanchez | |
| 2009/0119422 A1* | 5/2009 | Kale | G03G 15/5079 710/10 |
| 2010/0328684 A1* | 12/2010 | Cain | G06F 3/1212 358/1.2 |
| 2011/0062663 A1* | 3/2011 | Lin | A63F 3/00006 273/248 |
| 2011/0093366 A1 | 4/2011 | Nuggehalli et al. | |
| 2011/0194140 A1* | 8/2011 | Sweet | G06F 3/1204 358/1.15 |
| 2011/0231899 A1 | 9/2011 | Puller et al. | |
| 2011/0285765 A1* | 11/2011 | Lamontagne | B41J 3/36 347/3 |
| 2012/0131178 A1 | 5/2012 | Zhu et al. | |

FOREIGN PATENT DOCUMENTS

| | | |
|---|---|---|
| WO | 2011/130651 A1 | 10/2011 |
| WO | 2013/109858 A1 | 7/2013 |
| WO | 2014/145877 A2 | 9/2014 |

* cited by examiner

*Primary Examiner* — Allyson Trail
(74) *Attorney, Agent, or Firm* — McDonnell Boehnen Hulbert & Berghoff LLP

(57) ABSTRACT

Apparatus and methods related to a framework for carrying out tasks using transactions with printing networks are provided. The framework is provided to utilize a printing network. The printing network can include a plurality of printing-related devices that include at least one of: a cloud server, a print server, a controlling computing device, a client computing device, and a printing device. The framework can be configured to enable one or more operations to be performed by at least some of the plurality of printing-related devices. Software of the framework can be installed on each of the plurality of printing-related devices. The framework can be utilized to enable an operation of the one or more operations to be performed by at least some of the plurality of printing-related devices.

20 Claims, 10 Drawing Sheets

Framework Functionality 500

Jobs for Device Utilization 510
    JOB/JOBR messages

Job Accounting 520
    ACCT/ACCTR messages

Access Management 530
    ACCESS/ACCESSR messages

Solution Management 540
    SW/SWR messages

Network Control 550
    NETWORK/NETWORKR messages

Device Settings 560
    DEVSET/DEVSETR messages

Device Configuration 562
    DEVCONF/DEVCONFR messages

Device Usage Assessment 570
    DEVUSE/DEVUSER messages

Device Optimization 580
    DEVOPT/DEVOPTR messages

Device Service and Maintenance 590
    DEVSERV/DEVSERVR messages

FIG. 5

DOCUMENT SOLUTION MANAGEMENT PLATFORM IN A DECENTRALIZED ENVIRONMENT

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server.

The networks can include many printing devices. Some or all of the printing devices can have different features, functions, and capabilities. For example, some printing devices print in color, while others do not. As another example, some printing devices are equipped with duplexing hardware that allows printing on both sides of a sheet of paper, while other printing devices can only print on one side of a sheet of paper.

Several different network communication protocols and channels can be used to manage and utilize large numbers of printing devices. Once a printing device is installed, typically the printing device's specific remote network (e.g., Internet) configuration remains unchanged while the printer is in service.

SUMMARY

In one aspect, a method is provided. A framework to utilize a printing network is provided. The printing network includes a plurality of printing-related devices. The plurality of printing-related devices include at least one of: a cloud server, a print server, a controlling computing device, a client computing device, and a printing device. The framework is configured to enable one or more operations to be performed by at least some of the plurality of printing-related devices. Software of the framework is installed on each of the plurality of printing-related devices. The framework is utilized to enable an operation of the one or more operations to be performed by at least some of the plurality of printing-related devices.

In another aspect, a system is provided. The system includes a plurality of printing-related devices. The plurality of printing-related devices include at least one of: a cloud server, a print server, a controlling computing device, a client computing device, and a printing device. The plurality of printing-related devices include a particular printing-related device that includes one or more processors and data storage. The data storage is configured to store computer-readable instructions that, when executed by the one or more processors, cause the particular printing-related device to perform functions. The functions include: providing a framework to utilize a printing network, where the printing network includes the plurality of printing-related devices, where the framework is configured to enable one or more operations to be performed by at least some of the plurality of printing-related devices, and where software of the framework is installed on each of the plurality of printing-related devices; and utilizing the framework to enable an operation of the one or more operations to be performed by at least some of the plurality of printing-related devices.

In another aspect, an article of manufacture is provided. The article of manufacture includes computer-readable instructions that, when executed by one or more processors of a particular printing-related device of a plurality of printing-related devices, cause the particular printing-related device to perform functions. The functions include: providing a framework to utilize a printing network, where the printing network included the plurality of printing-related devices, where the plurality of printing-related devices include at least one of: a cloud server, a print server, a controlling computing device, a client computing device, and a printing device, where the framework is configured to enable one or more operations to be performed by at least some of the plurality of printing-related devices, and where software of the framework is installed on each of the plurality of printing-related devices; and utilizing the framework to enable an operation of the one or more operations to be performed by at least some of the plurality of printing-related devices.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 5 illustrates functionality for a framework of a printing network, according to an example embodiment.

DETAILED DESCRIPTION

Figure 1:
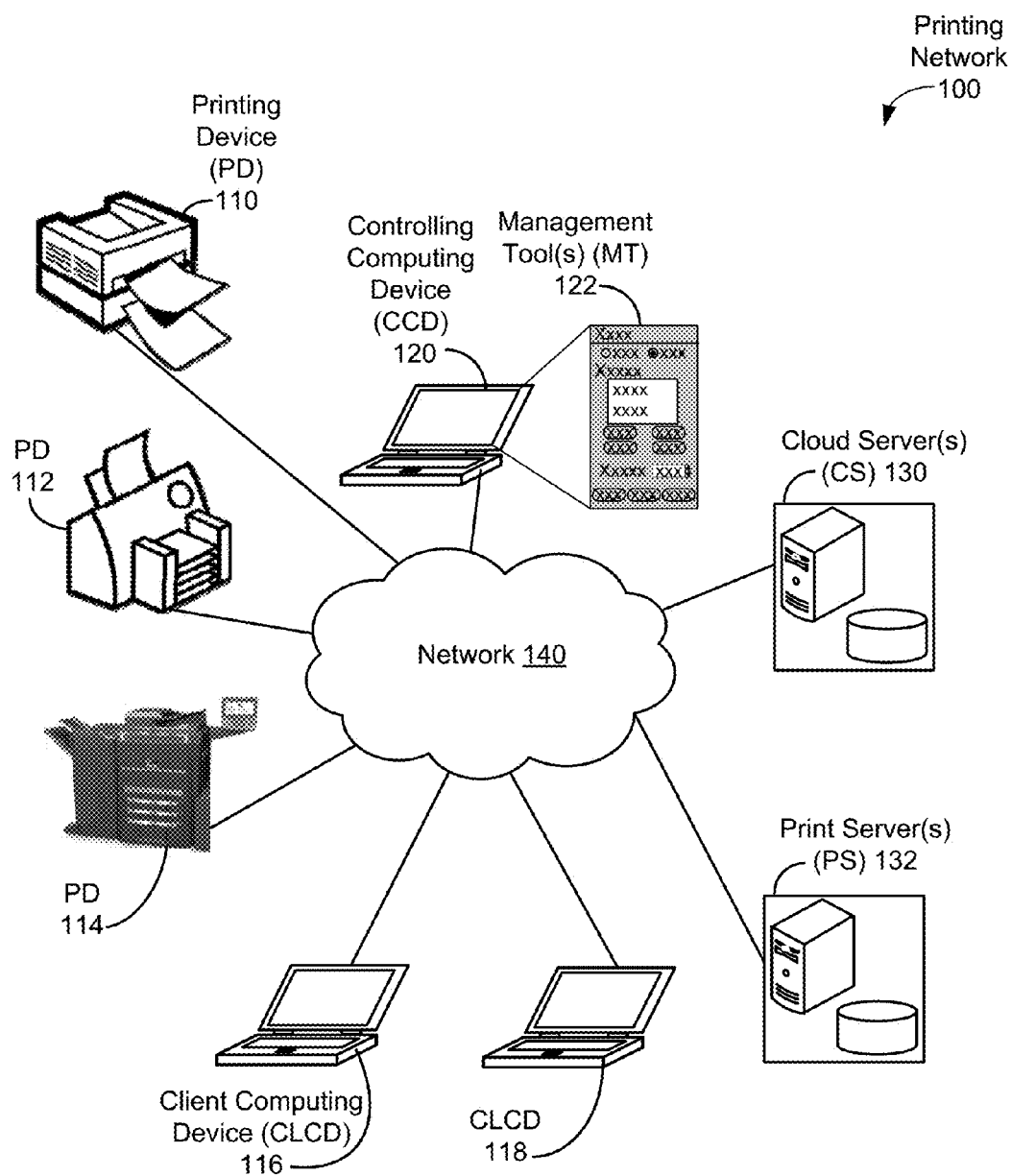
FIG. 1 is a diagram illustrating a printing network, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Example apparatus and methods are described herein related to a framework that enable document services and solutions utilizing a printing network that includes printing devices, print servers, controlling computing devices, and cloud servers. Increasingly sophisticated printing devices have become integral in daily business solutions and are now able to execute software applications. These applications can serve a variety of purposes making printing devices either centers of document processing or integrating them in various document solutions.

The framework can enable the software applications to provide document services and solutions. The framework can provide a printer/cloud abstraction layer, which is a common interface to disparate printing devices, print servers, controlling computing devices, and cloud-computing resources including cloud servers. Use of the framework can enable planning, building, and distribution of document services and solutions for general consumption and customization. Framework users and/or administrators can customize, configure, and manage functionality of the document services and solutions. In some embodiments, the framework can be configured to only share user-related data and/or applications after receiving explicit activation from the related user.

The framework can enable printing devices and print servers to maintain persistent connections to cloud servers in a document solution cloud. As an example, suppose that a new document solution S1 is published in the document solution cloud, where a framework user U1 utilizing a client device of the framework has a cloud subscription for a specific number of printing devices. U1 can use one or more management tools of the framework to discover S1 and, if necessary, obtain/purchase a client license for S1. The framework can have trusted administrative access to the client device and to a local print server available to the client device via a local network. The framework can acquire software for S1 from a cloud server and can install device-compatible software for S1 on the device and server-compatible software for S1 for local print server. Once S1 is installed, the framework can configure S1; e.g., to set up user-based job accounting automatic updates, permissions for device and users, certificates, client license, and specific settings of print-control server IP address, port, authentication type, The management tool(s) of the framework can manage document services and solutions in a unified way and allow printing device administrators to setup and manage document solutions in a secure manner. In some embodiments, the management tool(s) of the framework can be Internet accessible, allowing for remote administration of the document services and solutions and/or the printing network. In other embodiments, software for the framework can enable modification of functionality of one or more abstract layers of the framework; e.g., by users and/or administrators. By providing these abstract layer(s) and services for these abstract layer(s), the framework can ease development and deployment of cloud-related document services and solutions, and support subscription to the cloud-related document services and solutions.

Communication in the framework is bidirectional, allowing devices to send and receive messages related to tasks to be performed and replies to the tasks. Then, once all tasks associated with the open transaction have been performed, the open transaction can be closed by the source device(s). The framework can utilize one or more network protocols for communication. In some embodiments, framework-enabled devices can utilize a small number of protocols; e.g., HTTP, XMPP. In other embodiments, a number of different network protocols can be supported as part of the framework to retrieve information with minimum restrictions on local (and other) network configuration; e.g., restrictions on proxies, firewalls, domain name resolution, etc. These network protocols include, but are not limited to, File Transfer Protocol (FTP), HyperText Transport Protocol (HTTP), Java Message Service (JMS), Kyocera Page Description Language (KPDL), Printer Command Language (PCL), Portable Document Format (PDF), Page Description Language (PDL), Postscript, Simple Object Access Protocol (SOAP), Short Message Service (SMS), Simple Mail Transfer Protocol (SMTP), Simple Network Management Protocol (SNMP), Transmission Control Protocol/Internet Protocol (TCP/IP), User Datagram Protocol (UDP), Lightweight Directory Access Protocol (LDAP), and the Message Queue (MQ) family of network protocols.

The framework can provide document service and solution developers with a unified interface to a heterogeneous printing network of different printing devices and local servers, different controlling application platforms and different cloud-computing resources, reducing or eliminating the effort required in obtaining device-specific knowledge used while developing document service and solutions. The framework can simplify document service and solution deployment to heterogeneous printing networks, by rendering of abstract and specific source code into platform specific binaries and so automating a major part of the complexity involved with developing software that operates on specific platforms and systems. The framework can minimize challenges of initial setup where technicians need to visit onsite to setup connection, by providing consistent, and in some cases, remote access to one or more management tools for heterogeneous printing networks. The management tool(s) and other software of the framework can run in a local printing network to minimize security and privacy concerns that may be related to public cloud solutions. The framework software running in the local printing network can connect to local document services and systems to migrate and/or otherwise communicate data to integrate cloud-related document services and solutions with these local document services and systems, simplifying deployment of cloud-based services intended to replace and/or enhance (legacy) local document services and systems.

II. Printing System Examples

FIG. 1 is a diagram illustrating printing network 100, according to an example embodiment. Printing network 100 includes printing devices (PDs) 110, 112, 114, client computing devices (CLCDs) 116a . . . 116n, one or more controlling computing devices (CCDs) 120, one or more cloud servers (CSs) 130, and one or more print servers (PSs) 132 interconnected using network 140. In some examples, printing network 100 can have more, fewer, and/or different types of client computing devices, controlling computing devices, and/or printing devices than indicated in FIG. 1.

Printing devices 110, 112, 114 can include devices configured to scan, print, copy, e-mail, account for, communicate and/or otherwise process documents and/or files that are originally available either on paper or electronically. After processing by one or more of printing devices 110, 112, 114, the documents and/or files can be subsequently available either on paper or electronically, as requested. That is, printing devices 110, 112, 114 can process a paper document PD or electronic document ED by at least: creating an electronic document ED1 representing the contents of PD (e.g., scan PD to create ED1), making one or paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 110, 112, 114 to use/access ED and/or ED1, and/or communicate the contents of ED and/or ED1 to/from another device.

A document box can be storage allocated to an entity (e.g., a user, an administrator, a company, another type of entity) on a printing device, print server, or another device for the use of the entity to keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 110, 112, 114 can perform other tasks and/or other processing as well. Printing devices 110, 112, 114 can include products from various manufacturers with variations in color, speed, computing power, functionality, network connectivity, and/or other features.

In an example embodiment, some or all printing devices 110, 112, 114 can be connected to some or all client computing devices 116a-116n through one or more, possibly different, network protocols. Data can be transmitted between printing devices 110, 112, 114, client computing devices 116a-116n, controlling computing device(s) 120, cloud server(s) 130, and print server(s) 132 over wired and/or wireless links between client computing devices, controlling computing devices, printing devices, servers and network 140. The format of each respective data transmission between devices in printing network 100 can include one or more of a variety of different formats including: text formats, image formats, extensible mark-up language (XML), database tables, a flat file format, or another format.

Communications between the client computing devices, controlling computing devices, servers, and printing devices can include: client computing devices 116a-116n, controlling computing device(s) 120, cloud server(s) 130, and/or print server(s) 132 sending data for print jobs and/or print job portions for printing to printing devices 110, 112, 114 and printing devices 110, 112, 114 sending alert, status, error, and/or other messages to client computing devices 116a-116n, controlling computing device(s) 120, cloud server(s) 130, and/or print server(s) 132 to inform other devices about error or other conditions of the printing devices; e.g., idle, printing, sleeping, paper jam, low or out of paper, low or out of toner/ink, etc. Other communications between one or more client computing devices, one or more controlling computing devices, one or more servers, and one or more printing devices are possible as well.

Controlling computing device(s) 120 can execute device management software, such as one or more management tools (MT) 122, to perform device management functions for managing printing devices, such as printing devices 110, 112, 114. For example, controlling computing device(s) 120 can create, obtain, update, display, and/or delete data (and perhaps related software) for configurations of printing network 100. Example data for configurations of printing network 100, includes, but is not limited to: data for configuring devices in printing network 100; e.g., data for printing devices 110, 112, 114, data for configuring network protocols (e.g., FTP, HTTP, JMS, KPDL, PCT, PDF. SOAP, SMS, SMTP, SNMP, TCP/IP, UDP, LDAP, MQ, and/or other protocols), access-management related data for clients and/or servers; (e.g., passwords, signatures, credentials, certificates, subscriptions, licenses, and/or tokens related to accessing part or all of the functionality of network 140 and/or cloud-based services, software and/or solutions) and data for customizing, configuring and managing applications on devices/servers of printing network 100.

One or more cloud servers 130 can be configured to process jobs related to devices connected to network 140 and/or other networks; e.g., remotely accessible devices via a private network such as a VPN and/or LAN not directly connected to network 140, Internet-accessible devices that may or may not have access to network 140. In some embodiments, cloud server(s) 130 can provide some or all of the functionality for one or more document solutions and managed print services; e.g., functionality for accounting and maintenance of solutions and services, functionality for document workflows, such as processing forms, hard-copy signatures, client authentication/access functions, user interface functionality, local and/or remote network based storage management involving devices in printing network 100.

One or more print servers 132 can be configured to process jobs (e.g., spool job-related data, route jobs, provide user and/or server-related accounting for jobs, verify/enforce authentication and authorization rules related to jobs) and store data related to printing devices of network 140 as part of performing the herein-described functionality of a print server. The jobs processed by cloud server(s) 130 and print server(s) 132 can include, but are not limited to, print jobs/printing requests, communicating documents, files, and/or related data (e.g., data in e-mails, SMS messages, etc.), document and file-related requests (e.g., creating, formatting, scanning, reformatting, converting, accessing, updating and/or deleting one or more documents and files), jobs for document workflow, and/or processing information about errors/complaints about the printing device (e.g., creating, reviewing, updating, assigning, reassigning, communicating, and/or deleting trouble tickets related to errors/complaints about printing (and perhaps other) devices 110, 112, 114. The data can include data used in processing jobs (e.g., spooled data for print jobs, files for file-related requests, etc.), access-management related data, primary identification characteristics and/or model-dependent information about printing devices served by cloud server(s) 130 and/or print server(s) 132, and perhaps other data.

Figure 2:
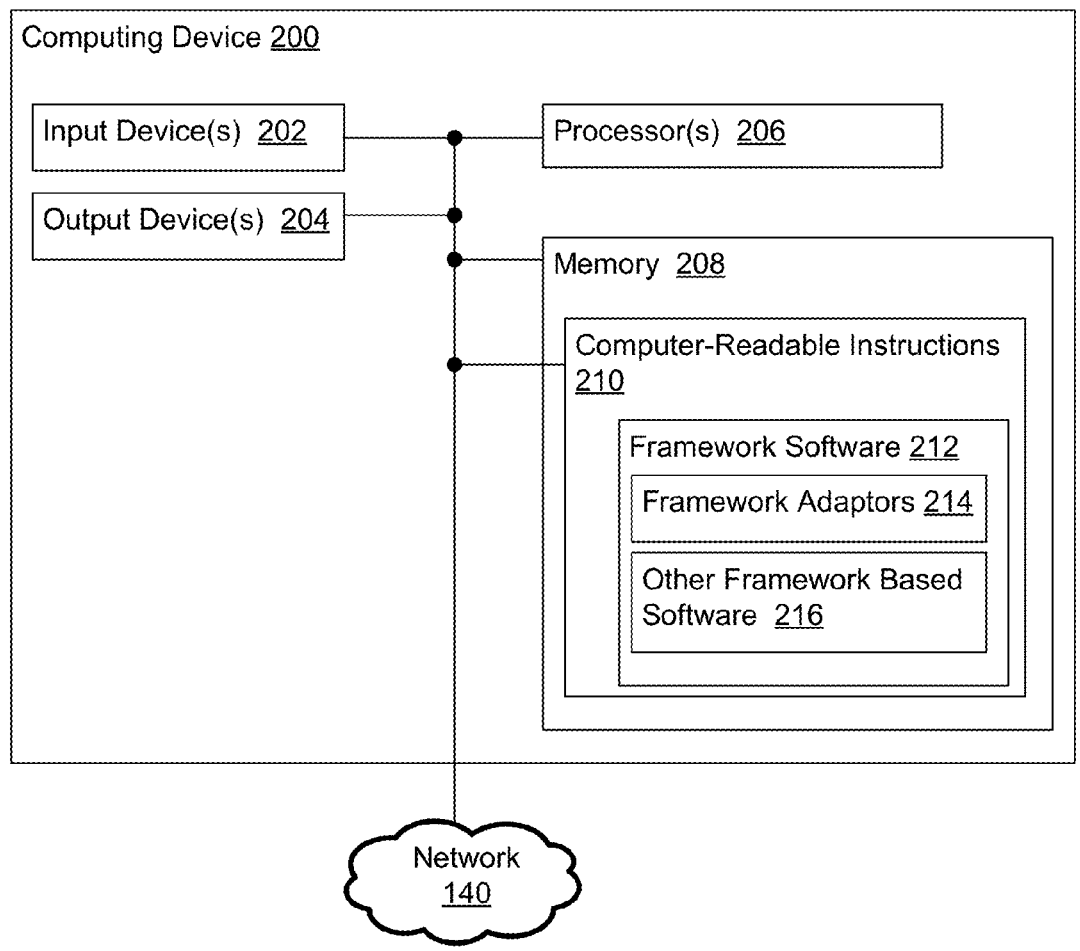
FIG. 2 is a schematic block diagram illustrating a computing device, according to an example embodiment.

FIG. 2 is a schematic block diagram illustrating computing device 200, according to an example embodiment. In some embodiments, computing device 200 can be configured to perform one or more herein-described functions of printing network 100, printing devices 110, 112, 114, client computing devices 116, 118, controlling computing device 120, cloud server(s) 130, print server(s) 132, network 140, file/message communications 310, 312, 314, herein-described network protocols, architecture 400, framework functionality 500, method 1000, and/or part or the entire herein-described functionality related to scenarios 600, 700, 800, and 900.

Computing device 200 can include one or more input devices 202, one or more output devices 204, one or more processors 206 and memory 208. Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 140. Sensors can include devices configured to measure conditions in an environment of computing device 200 and provide data about that environment, such data including, but not limited to, location data, velocity (speed, direction) data, acceleration data, and other data about the environment for computing device 200. Example sensors include, but are not limited to, GPS sensor(s), location sensors(s), gyroscope(s), accelerometer(s), magnetometer(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 140. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 206 can be configured to execute computer-readable program instructions 210 that are contained in memory 208 and/or other instructions as described herein.

Memory 208 can include non-transitory machine-readable storage configured to store data and/or instructions. In particular, memory 208 can store machine-readable instructions 210 that, when executed by processor(s) 206, can cause a computing device to perform functions, such as but not limited to, functions of herein-described devices, networks, methods, features, and scenarios. In particular, machine-readable instructions 210 can include instructions for herein-described framework software 212 that can include one or more framework adaptors 214 and other framework-based software 216.

Figure 3:
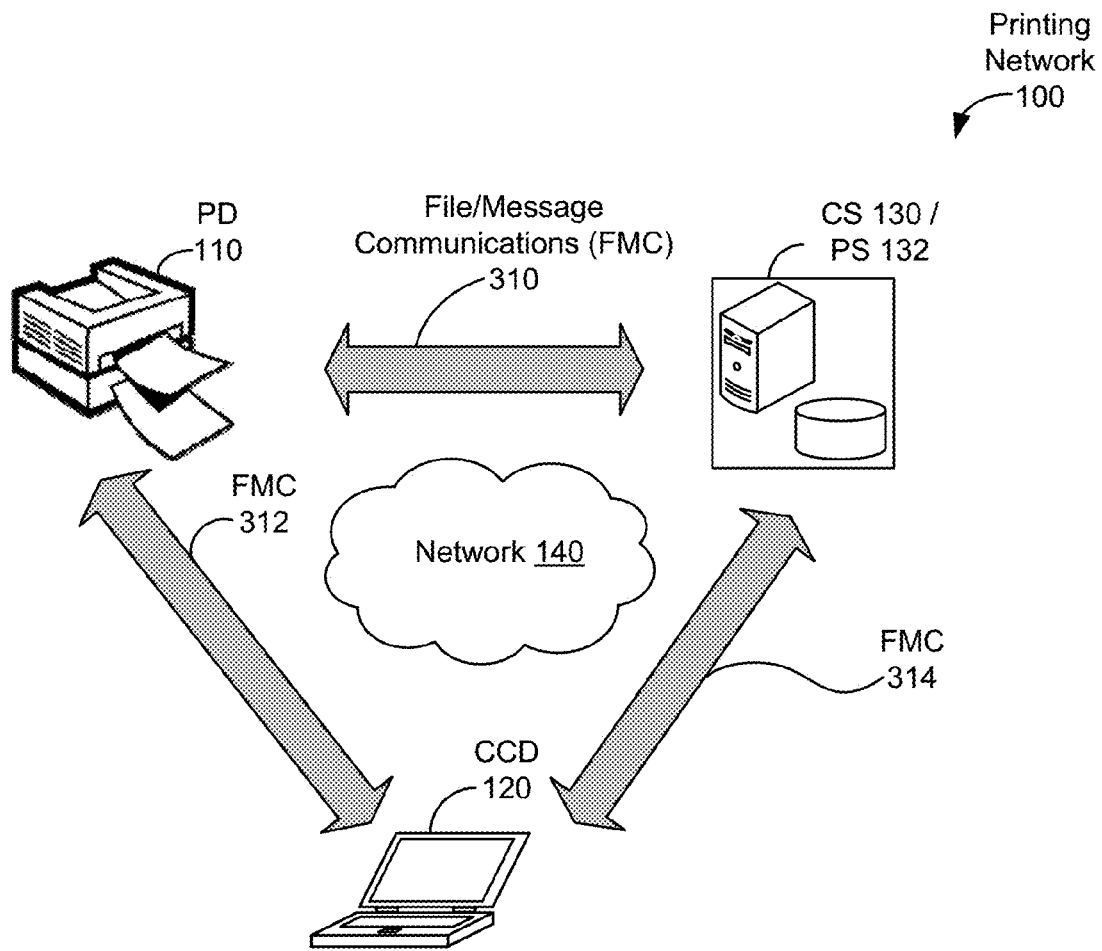
FIG. 3 illustrates communications for a printing network, according to an example embodiment.

FIG. 3 illustrates communications for printing network 100, according to an example embodiment. FIG. 3 shows printing device 110, controlling computing device 120, and cloud server 130 communicating via network 140, such as discussed above in the context of FIG. 1. In particular, FIG. 3 shows printing device 110 having bi-directional file/message communications (FMC) 310 that includes files and messages conveyed with cloud server 130 and having bi-directional file/message communications 312 that includes files and messages conveyed with controlling computing device 120. Also, cloud server 130 can have bi-directional file/message communications 314 that includes files and messages conveyed with controlling computing device 120.

FIG. 3 also shows example network protocols that can be used for incoming and outgoing communications included in file/message communications 310, 312, and/or 314. Example incoming network protocols include, but are not limited to, HTTP/SOAP, JMS, FTP, SMTP, one or more file-based protocols, one or more Page Description Languages (PDLs) such as KPDL, PCL, PDF, etc., and any protocols related to messages of the herein-described framework. Also, example outgoing network protocols include, but are not limited to, HTTP/SOAP, JMS, FTP, SMTP, one or more file-based protocols, one or more Page Description Languages (PDLs) such as KPDL, PCL, PDF, etc., and any protocols related to messages of the herein-described framework.

III. Example Printer Framework

Figure 4:
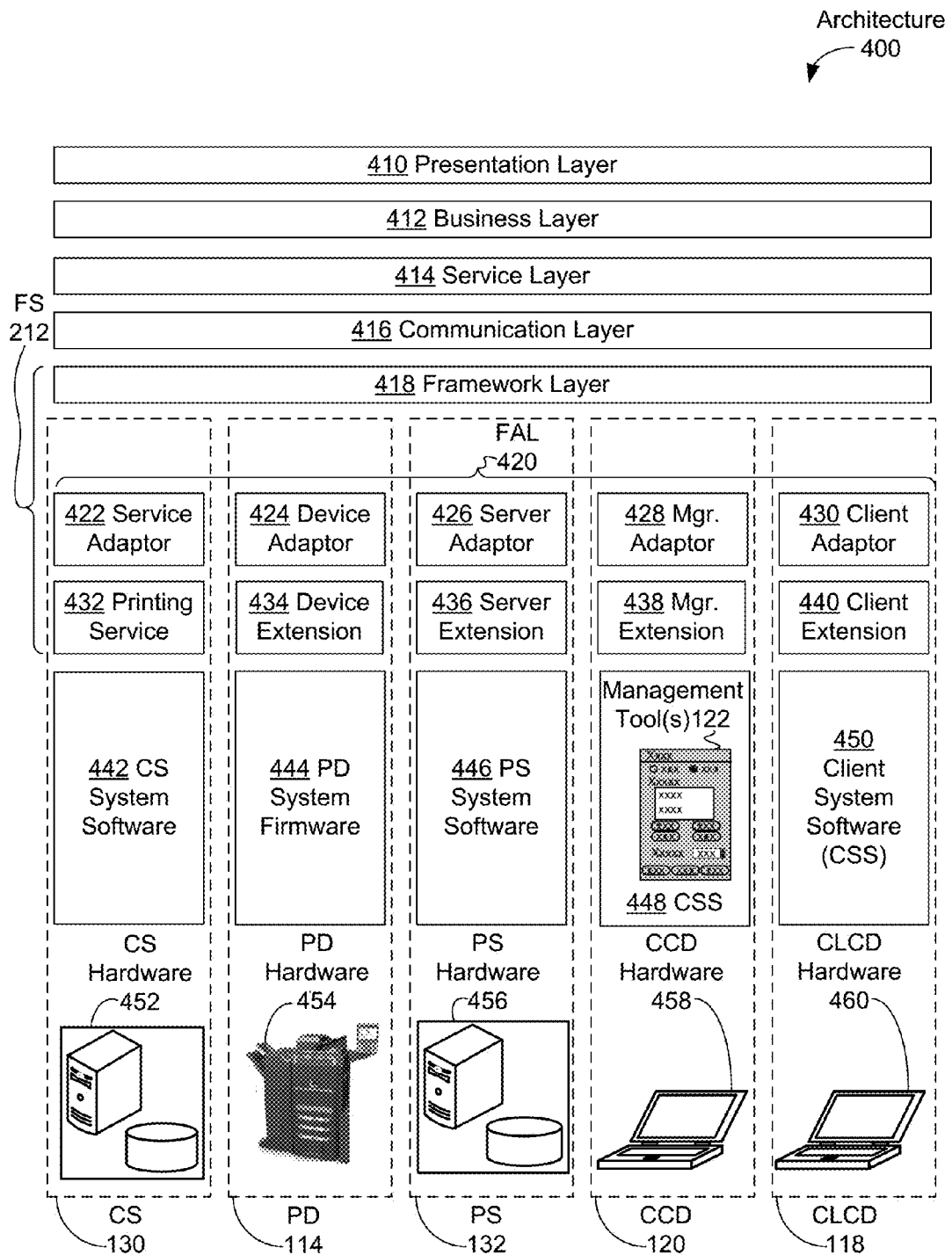
FIG. 4 is a block diagram of an architecture for a framework of a printing network, according to an example embodiment.

FIG. 4 is a block diagram of architecture 400 for a framework of a printing network, such as printing network 100, according to an example embodiment. Architecture 400 for the framework has several logical layers that include (from top down): business layer 410, presentation layer 412, service layer 414, communication layer 416, framework layer 418, framework adaptor layer (FAL) 420 shown in FIG. 4 including adaptors 422, 424, 426, 428, 430, a local service/extension layer shown in FIG. 4 including services/extensions 432, 434, 436, 438, 440, a local system layer shown in FIG. 4 including system firmware/software 442, 444, 446, 448, 450, and a local hardware layer shown in FIG. 4 including hardware 452, 454, 456, 458, 460. FIG. 4 indicates that framework software (FS) 212 for implementing the herein-described framework can include part or all of framework layer 418, the local adaptor layer, and the local service/extension layer.

Architecture 400 shows functionality grouped into the aforementioned logical layers. In architecture 400, a logical layer serves the logical layer(s) above it and is served by the logical layer(s) below it. For example, suppose a layer L generates a network path that enables reliable communication across a network, then layer L can provide the network path to one or more layers above layer L and can establish, maintain, and communicate contents along the network path using one or more layers below layer L.

The use of logical layers in architecture 400 enables new solution development based on design-related requirements they create a design which defines functions, components, and communications for services that utilized the printing network. Implementation of the design can be concentrated on the layer(s) of architecture 400 that require new/modified software based on the design. Further, use of architecture 400 allows division of labor to implement the design: one set of developers can work one or more layers (e.g., presentation, business, service, and/or communication layers), while another set of developers can concentrate on other layers, such as a framework layer.

Software for part or all of some or all layers of architecture 400 can be resident in a device D4 that resides in printing network 100. For the example shown in FIG. 4 and throughout the disclosure herein related to FIG. 4, device D4 can be a printing device, such as printing device 114, a client computing device such as client computing device 118, a controlling computing device such as controlling computing device 120, a cloud server such as cloud server 130, or a print server such as print server 132.

Presentation layer 410 can include software for delivering and formatting information that has arrived via an agreed-upon set of protocols and methods specified by business layer 410. In the context of printing network 100, presentation layer 412 for device D4 can include software for delivering and formatting information that has arrived for device D4 via network 140 or perhaps another network N4.

Business layer 412 can include software for installing, configuring, removing, managing licenses and perhaps other service-related credentials, and/or accounting for usage of one or more software services. In the context of printing network 100, business layer 412 for device D4 can include software for installing, configuring, removing, managing licenses, and/or usage accounting for service(s) installed on device D4 that utilize formatted information delivered via network 140 or perhaps another network N4; e.g., N4 can be the Internet, another local network, or a different wide-area network from the Internet.

Service layer 414 can include software for establishing, maintaining, and communicating with the one or more services installed and configured via business layer 412. In some embodiments, the one or more services can use service layer 414 to establish and maintain one or more sessions, or permanent or semi-permanent two-way interactive information interchanges, for service-related communications. In the context of printing network 100, service layer 414 for device D4 can include software for establishing, maintaining, and/or communicating with the one or more installed services, perhaps using one or more sessions, that utilize the formatted information that has arrived for device D4 via network 140 or perhaps another network N4.

Communication layer 416 can include software for establishing and maintaining one or more end-to-end communication services that utilize the information provided by the service(s) and perhaps session(s) of service layer 414. The end-to-end communication services can include, but are not limited to, connection-oriented end-to-end services, connectionless end-to-end services, data transmission and/or retransmission services, flow control services, congestion detection and/or avoidance services, multiplexing services, and data reliability related services. In the context of printing network 100, communication layer 416 for device D4 can include software for establishing and maintaining one or more end-to-end communication services that enable the one or more installed services of device D4 to communicate via network 140 or perhaps another network N4.

Framework layer 418 can include software for performing device-independent features of the herein-described framework using one or more end-to-end communication services provided by communication layer 416. For example, framework layer 418 can format, generate, and communicate messages associated with framework functionality, such as, but not limited to, some or all of the messages discussed at least below in the context of framework functionality 500 of FIG. 5 and scenarios 600, 700, 800, and 900 of respective FIGS. 6, 7, 8, and 9. As another example, framework layer 418 can provide some or all device-independent features for device utilization, job accounting, access management, solution management, and/or network control, such as, but not limited to, aspects of framework functionality 500 discussed below in the context of FIG. 5. In the context of printing network 100, framework layer 418 for device D4 can include software for performing device-independent features of the herein-described framework utilizing one or more end-to-end communication services that enable device D4 to communicate via network 140 or perhaps another network N4.

Below framework layer 418, each layer can include device specific components, as indicated in FIG. 4 using a dashed box for each of cloud server 130, printing device 114, print server 132, controlling computing device 120, and client computing device 118. In some embodiments, one computing device can be configured to perform multiple roles; e.g., one computing device can be configured to act as a client computing device and as a controlling computing device, another computing device can be configured to act as a cloud server and as a print server. In other embodiments, multiple computing devices can perform one role; e.g., multiple computing devices can be configured to share the workload of one logical print server or one logical cloud server.

One or more adaptors of framework adaptor layer 420 configured to operate in a device utilizing the herein-described framework can convert device-independent framework communications from framework layer 418 into device-specific framework communications that can be processed by a specific device (and vice versa). For example, service adaptor 422, device adaptor 424, server adaptor 426, manager (mgr.) adapter 428, and client adaptor 430 can respectively convert device-independent framework communications from framework layer 418 into device-specific framework communications that can be processed by cloud server 130, printing device 114, print server 132, controlling computing device 120, and client computing device 118, respectively (and vice versa). In some embodiments, some or all functionality of framework adaptor layer 420 can be carried out by framework layer 418. In other embodiments, some or all of the adaptors in framework adaptor layer 420 can be configured to perform additional, fewer, and/or different functionality than converting device-independent framework communications to device-specific framework communications and vice versa.

Services and extensions of the local service/extension layer can use the device-specific framework communications provided by framework adaptor layer 420 to perform functions of the herein-described framework on specific devices. For example, printing service 432, device extension 434, server extension 436, manager extension 438 (along with management tool(s) 122), and client extension 440 can respectively use device-specific framework communications to perform functions of the herein-described framework on cloud server 130, printing device 114, print server 132, controlling computing device 120, and client computing device 118, respectively. In some embodiments, some or all functionality of framework adaptor layer 420 can be carried out by framework layer 418 and/or framework adaptor layer 420. In other embodiments, some or the entire services framework adaptor layer 420 can be configured to perform additional, fewer, and/or different functionality than converting device-independent framework communications to device-specific framework communications and vice versa.

The local system layer can include software and/or firmware for the device that can be relied upon by the local service/extension layer to carry out functions of the herein-described framework by the device. For example, cloud server software 442, printing device firmware 444, print server software 446, client computing software (CSS) 448, and client computing software 450 can respectively provide software that can be relied upon by at least the local service/extension layer to perform functions of the herein-described framework on cloud server 130, printing device 114, print server 132, controlling computing device 120, and client computing device 118, respectively. Examples of software in the local system layer can include, but are not limited to, operating system software, application software, and other software (e.g., web browsers, GUI software, communications protocol stack(s)). In some embodiments, the local system layer can include framework-related software; e.g., management tool(s) 122 can be part of client system software 448 of controlling computing device 120. In other embodiments, computer-readable instructions 210 for a device can include at least some of the software of framework layer 418, framework adaptor layer 420, local service/extension layer, and/or the local system layer resident on the device.

In other embodiments, the controlling computing device can be configured to execute at least controlling-tool software; e.g., management tool(s) 122, manager adaptor 428, manager extension 438 and client software; e.g., client system software 448. Then the controlling-tool software and at least part of the client software are each part of the software of the framework, such as illustrated in FIG. 4. The controlling-tool software can be configured to administer at least some device(s) in printer network 100. Also, the client software can be configured to perform functions such as, but not limited to: synchronizing documents and/or addresses with one or more cloud services (perhaps provided by cloud server 130), acting as an agent for a printing device such as printing device 114, enabling access control and/or accounting of user operations on controlling computing device 120.

The local hardware layer can include hardware and/or firmware of a device. The hardware and/or firmware of the local hardware layer can carry out instructions executable as software in the local system layer at least to perform functions of the herein-described framework on specific devices. For example, cloud server hardware 452, printing device hardware 454, print server hardware 456, controlling computing device hardware 458, and client computing device hardware 460 can respectively carry out instructions executable as software in the local system layer perform functions of the herein-described framework on cloud server 130, printing device 114, print server 132, controlling computing device 120, and client computing device 118, respectively. In some embodiments, some or all of the hardware and/or firmware local hardware layer can include some or all of the hardware and/or firmware discussed in the context of at least input devices 202, output devices 204, processors 206, and memory 208 of computing device 200 of FIG. 2.

FIG. 5 illustrates framework functionality 500 for a printing network, such as printing network 100, according to an example embodiment. Part or all of framework functionality 500 can be performed by part or all of framework software 420 using one or more task-initiating messages sent between devices in the printing network. These task-initiating messages include JOB messages related to initiating and specifying jobs for device utilization 510, ACCT messages related to initiating and specifying job accounting 520 tasks, ACCESS messages for initiating and specifying access management 530 tasks, SW messages related to initiating and specifying solution management 540 tasks, NETWORK messages related to initiating and specifying network control 550 tasks, DEVSET messages related to device settings 560 tasks, DEVCONF messages related to device configuration 562 tasks, DEVUSE messages related to device usage assessment 570 tasks, DEVOPT messages related to device optimization 580 tasks, and DEVSET messages related to device service and maintenance 590 tasks. A task-initiating message can have a corresponding response message; e.g., a respective JOBR, ACCTR, ACCESSR, SWR, NETWORKR, DEVSETR, DEVCONFR, DEVUSER, DEVOPTR, or DEVSERVR response message can act as a reply to a respective JOB, ACCT, ACCESS, SW, NETWORK, DEVSET, DEVCONF, DEVUSE, DEVOPT, or DEVSERV task-initiating message.

A first task-initiating message and subsequent messages, including response messages, can be associated with a transaction, which can be identified using as transid. A transaction is a logical operation, such as performing a print job or uploading service-related software that can be carried out using one or more framework messages, including one or more different types of task-initiating messages and one or more responses to the task-initiating messages and utilizing one or more devices in a printing network, such as printing network 100.

As illustrated below, and particularly in the context of scenarios 600, 700, 800, and 900 of FIGS. 6-9, a framework message can use the following format:

TYPE(transid,[opid,|devid,|userid,]*data1[,data2]*), where:
  TYPE is a type of message mentioned above in Table 1;
    e.g., a JOB, JOBR, ACCT, ACCTR, ACCESS, ACCESSR, SW, SWR, NETWORK, NETWORKR, DEVSET, DEVSETR, DEVCONF, DEVCONFR, DEVUSE, DEVUSER, DEVOPT, DEVOPTR, DEVSERV, or DEVSERVR message;
  transid is an identifier associated with the message can be used to distinguish each of a number of transactions that can be carried out by the framework; e.g., distinguishing a first transaction with a transaction ID=1 from a second transaction with a transaction ID=2;
  opid specifies an operation or identifier associated with the message; e.g., the "Search" opid can specify that a message of type JOB is used to carry out a search operation as part or all of the JOB, the "Print" opid of a message of type ACCT can indicate that a print related accounting value or values are to be created, reviewed, deleted, and/or updated as a consequence of the message;
  devid specifies one or more devices associated with a message—in some embodiments, multiple devices can be specified as a list of devids separated by spaces; e.g., one or more identifiers of printing device(s) for printing a document, one or more identifiers of device(s) to be searched;
  userid specifies one or more users associated with the message—in some embodiments, multiple users can be specified as a list of userids separated by spaces; and
  data1 and data2 are data items associated with the message; e.g., for a message of type JOB having a "Print" opid, a data item can specify the name of a document to be printed; for a message of type JOBR, a data item can specify a response to a previous JOB message, such as, but not limited to, "Yes" indicating successful completion, "No" indicating unsuccessful completion, or a value/response code provided as a result of the previous JOB message.

Table 1 includes information about messages, jobs, and features related to framework functionality 500, including messages, jobs, and features related to device utilization 510, job accounting 520, access management 530, solution management 540, network control 550, device settings 560, device configuration 562, device usage assessment 570, device optimization 580, and device service and maintenance 590.

TABLE 1

Jobs for Device Utilization 510
  Utilize JOB/JOBR messages.
  Tasks/jobs for device utilization 510 can include, but are not limited to, tasks/jobs that:
    scan docs (from job request/outside world/document box) into files
    spool docs for printing invoked
    print files (either as part of job or in document box)
    get/store/copy/modify/manipulate files (e.g., within/between document boxes)
    email text/files
    OCR files (in document boxes)
    file transfer (between document boxes)
    create/complete/review/close trouble tickets for devices
  Different kinds of tasks/jobs can be specified using opids; e.g., a JOB(1, Scan, 114, "Doc1") message can indicate that transaction 1 (or job id 1) includes device 114 scanning a paper document into an electronic document/file named "Doc1", while a JOB(2, Print, 114, "Doc1") message includes device 114 printing an electronic paper document "Doc2" to paper
Job Accounting 520
  Can utilize ACCT/ACCTR messages
  Tasks/jobs for job accounting 520 can include, but are not limited to, tasks/jobs that:
    Set/update usage statistics and
    Get/report usage statistics,
    Where usage statistics can include, but are not limited to, statistics for creating,
  printing, scanning, copying, e-mailing/communicating, storing, accessing, updating, and/or
    deleting data, document(s), and/or file(s).
Access Management 530
  Can utilize ACCESS/ACCESSR messages
  Tasks/jobs for access management 530 can include, but are not limited to, tasks/jobs related to access credentials including:
    Review, update, delete, and/or insert jobs related to authentication
    Review, update, delete, and/or insert jobs related to passwords
    Review, update, delete, and/or insert jobs related to certificates
    Review, update, delete, and/or insert jobs related to access-related tokens
    Review, update, delete, and/or insert jobs related to network licenses
    Review, update, delete, and/or insert jobs related to network subscriptions
    Review, update, delete, and/or insert jobs related to both electronic and physical
  signatures
Solution Management 540
  Can utilize SW/SWR messages
  Tasks/jobs for solution management 540 can include, but are not limited to, tasks/jobs that:
    Add/update solution software to device(s)
    Delete solution software to device(s)
    Review, update, delete, and/or insert device-related data (operating parameters,
  software/hardware release/version information, data about equipped devices/sub-devices,
  other data)
Network Control 550
  Can utilize NETWORK/NETWORKR messages
  Tasks/jobs for network control 550 can include, but are not limited to, tasks/jobs that:
    Add/update solution software to device(s)
    Delete solution software to device(s)
    Review, update, delete, and/or insert network-related data (IP/MAC/SMTP/other
  addresses, port, directory services (LDAP), e-mail/file server (SMTP/FTP/SMB),
  authentication types)
    Fan out data, files, documents, and/or messages (for all message type; that is, fanouts
  can be performed without explicitly utilizing NETWORK/NETWORKR messages)
    Fan in data, files, documents, and/or messages (for all message types; that is, fanins can
  be performed without explicitly utilizing NETWORK/NETWORKR messages)
    Route files, documents, and/or messages between devices (for all message types; that
  is, routing can be performed without explicitly utilizing NETWORK/NETWORKR
  messages)
Device Settings 560
  Can utilize DEVSET/DEVSETR messages
  Tasks/jobs for device settings 560 can include, but are not limited to, tasks/jobs that:
    Perform one or more operations on current and/or default device settings
    Example operations on device settings include operations to review, update, delete,
  and/or insert device settings.
    Examples of device settings include, but are not limited to: printing-related settings
  (e.g., duplex on, duplex off, paper trays, language-related settings), and scanning-related
  settings (e.g., input paper size, output dots-per-inch, supported output file types, output file
  names/naming conventions), TABLE 1-continued Device Configuration 562
  Can utilize DEVCONF/DEVCONFR messages
  Tasks/jobs for device configuration 562 can include, but are not limited to, tasks/jobs that:
    Perform one or more operations on current and/or default device configuration data.
    Example operations on device configuration data include operations to review, update,
    delete, and/or insert device configuration data.
    Examples of device configuration data include, but are not limited to: timer values,
    such as sleep timer values, finishing configuration data (e.g., stapler on/off, hole punching
    on/off), and associated (networked) storage settings (e.g., values indicating type(s) of
    available storage, storage device locations, storage device sizes, storage device speed/
    bandwidth settings).
Device Usage Assessment 570
  Can utilize DEVUSE/DEVUSER messages
  Tasks/jobs for device usage assessment 570 can include, but are not limited to, tasks/jobs
that:
    Perform one or more operations for device usage assessment.
    Example operations on device usage assessment include operations for reporting,
    auditing, and resetting device performance data.
    Example device performance data include data related to: toner coverage, actual input
    and/or output speeds, counts of pages printed and/or scanned per period of time (day, week,
    month, year, custom date range), counts of black-and-white pages printed and/or scanned
    per period of time, color pages printed and/or scanned per period of time, statistics
    (average, minimum, maximum, etc.) on print/scan job sizes, job times, pages between
    paper jams for printing and/or scanning, and toner/ink replacement data (e.g., time and/or
    pages printed since toner/ink replaced).
Device Optimization 580
  Can utilize DEVOPT/DEVOPTR messages
  Tasks/jobs for device optimization 580 can include, but are not limited to, tasks/jobs that:
    Perform one or more operations related to device optimization.
    Example operations related to device optimization include operations for matching
    device usage with device specifications, comparing initial costs with operational costs,
    tuning of device, network, and/or other parameters to increase performance and/or lower
    costs.
Device Service and Maintenance 590
  Can utilize DEVSERV/DEVSERVR messages
  Tasks/jobs for device service and maintenance 590 can include, but are not limited to,
tasks/jobs that:
    Perform one or more operations related to servicing and maintaining printing devices.
    Example operations to servicing and maintaining printing devices include, but are not
    limited to operations for and/or operations related to software and/or firmware upgrades,
    remote device panel access, obtaining device panel images, maintenance mode settings,
    service settings, alert notifications, and panel notes.

Framework messages can be conveyed using one or more network protocols, such as, but not limited to the network protocols discussed herein. In some embodiments, some or all framework messages can be conveyed by multiple protocols; e.g., a framework message can be conveyed in one or more TCP packets conveyed using IP.

In other embodiments, some or all framework messages can be compressed, encrypted, hashed, and/or otherwise reformatted, perhaps using relatively transparent techniques. For example, software communicating framework messages could automatically or otherwise be directed to compress and/or encrypt some or all outgoing framework messages and/or decompress and/or decrypt some or all incoming framework messages. As another example, software communicating framework messages could be protected by using Secure HTTP (SHTTP) links to convey the framework messages.

In still other embodiments, more, fewer, and/or different messages can be used as part of the framework than discussed herein. In even other embodiments, some or all of the messages described herein as part of the framework can have different formats; e.g., part or all of some or all of the framework messages can be formatted using a binary format, a numeric format, different alpha-numeric format(s), and/or other formats. In yet other embodiments, different framework messages can be conveyed using different protocols; e.g., a SW message with a Get or Set opid can be conveyed, at least in part, using the SNMP protocol, while an ACCESS message with a Download or Upload opid can convey files at least in part using the FTP protocol. Many other examples of framework messages are possible as well.

IV. Scenarios Utilizing the Example Printer Framework

Scenarios 600, 700, 800, and 900 involve examples of using herein-described framework to operate devices of printing network 100 shown in FIG. 1. The framework messages discussed above in the context of framework functionality 500 of FIG. 5 and/or discussed below in the context of scenarios 600, 700, 800, and 900 can be conveyed using one or more network protocols, such as, but not limited to the network protocols used to convey file/message communications 310, 312, 314 discussed above in the context of FIG. 3.

Figure 6:
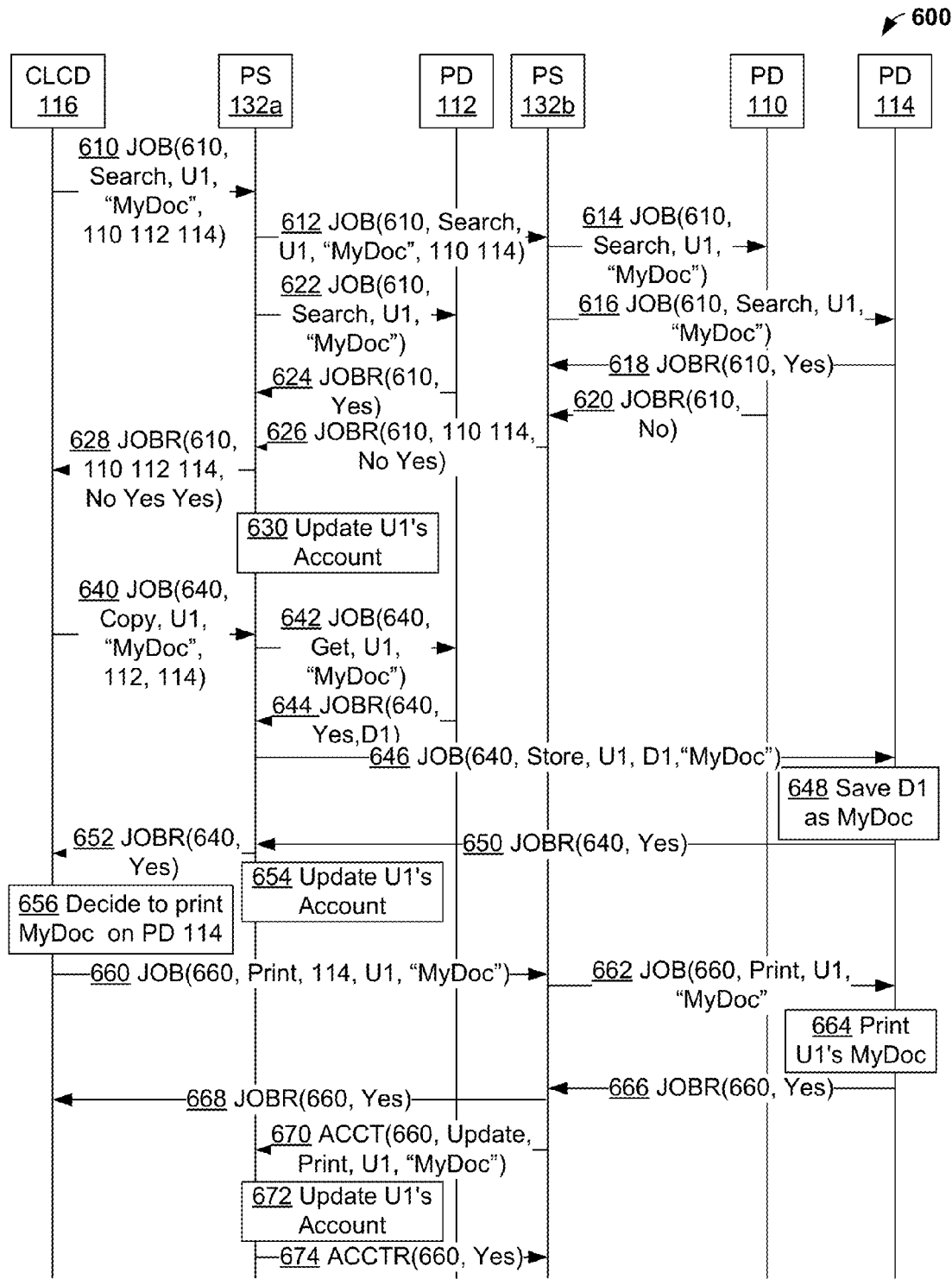
FIG. 6 is a communication flow diagram for a scenario related to framework functionality in a printing network, according to an example embodiment.

FIG. 6 is a communication flow diagram for scenario 600 related to framework functionality 500 in printing network 100, according to an example embodiment. Scenario 600 is related to document management, including searching for documents, copying documents between servers, and printing documents.

In scenario 600, client computing device 116 initiates job 610 on behalf of a user "U1" to search for a document named "MyDoc" on file/document storage locations of printing devices 110, 112, 114. The search results indicate that copies of the MyDoc document can be found on printing devices 112 and 114. Job accounting records for user U1 are updated on print server 132*a* to account for the search. User U1 then uses requests the copy of MyDoc on printing device 112 be copied to printing device 114, and the appropriate job accounting records for user U1 are updated on print server 132a. User U1 then decides to print MyDoc on printing device 114, and the appropriate job accounting records for user U1 are updated on print server 132a.

Scenario 600 can begin with client computing device 116 sending JOB message 610 to print server 132a. FIG. 6 shows that JOB message 610 has a transaction ID of "610", an opid of "Search" indicating the job is a search request, a userID of "U1" indicating the search request is for/on behalf of user U1, data1 of "MyDoc" indicating a search term of "MyDoc" is to be used for the search request, and data2 of "110 112 114" indicating device identifiers that identify respective printing devices 110, 112, and 114 as targets for the search request.

In scenario 600, print server 132a is in direct communication with printing device 112, while print server 132b is in direct communication with printing devices 110 and 114. Upon receipt of JOB message 610, print server 132a determines that print server 132b is in direct communication with printing devices 110 and 114, and so generates and sends JOB message 612 to print server 132b to carry out the search request on printing devices 110 and 114.

Print server 132b then generates and sends respective JOB messages 614, 616 to printing devices 110, 114 to carry out the search request for document "MyDoc". In response to JOB message 616, printing device 114 searches for and finds "MyDoc", and subsequently generates and sends JOBR message 618 with a data1 value of "Yes" to print server 132b as an indication that printing device 114 found "MyDoc". Also, in response to JOB message 614, printing device 110 searches for but does not find "MyDoc", and subsequently generates and sends JOBR message 620 with a data1 value of "No" to print server 132b as an indication that printing device 110 did not find "MyDoc".

After receiving JOBR messages 618, 620, print server 132b generates and sends JOBR message 626 to print server 132a with a devid of "110 114" with a data1 value of "No Yes" indicating that (a) printing device 110, the first device listed in the devid, did not find "MyDoc" as indicated by the first value "No" of the data1 field, and (b) printing device 114, the second device named in the devid, did find "MyDoc" as indicated by the second value "Yes" of the data1 field.

Print server 132a also generates and sends JOB message 622 to printing device 112 to carry out the search request for document "MyDoc". In response to JOB message 622, printing device 112 searches for and finds "MyDoc", and subsequently generates and sends JOBR message 624 with a data1 value of "Yes" to print server 132a as an indication that printing device 112 found "MyDoc".

Scenario 600 continues with print server 132a receiving JOBR messages 624 and 626 and so determining that printing device 110 did not find "MyDoc" but printing devices 112 and 114 did find "MyDoc". Then, print server 132a generates and sends JOBR message 628 for job 610 to print server 132a with a devid of "110 112 114" with a data1 value of "No Yes Yes" indicating that (a) printing device 110, the first device listed in the devid, did not find "MyDoc" as indicated by the first value "No" of the data1 field, and (b) printing devices 112 and 114, which are the second and third devices named in the devid, each found "MyDoc" as indicated by the second and third values "Yes Yes" of the data1 field. Print server 132a also completes the procedures of block 630 and updates user accounting data for user U1 to record that user U1 has requested a search for a document on three printing devices.

In scenario 600, user U1 examines the copies of the MyDoc document on printing devices 112 and 114, and determines that the document copy on printing device 112 should replace the document copy on printing device 114. FIG. 6 shows that client computing device 116 then generates and sends JOB message 640 to print server 132a. FIG. 6 shows that JOB message 640 has a transaction ID of "640", an opid of "Copy" indicating the job is a copy request, a userID of "U1" indicating the search request is for/on behalf of user U1, data1 of "MyDoc" indicating a document named "MyDoc" is to be copied, data2 of "112" indicating printing device 112 is a source device for the document to be copied, and data3 of "114" indicating printing device 114 is a destination device for the document to be copied.

Upon receipt of JOB message 640, print server 132a generates and sends JOB message 642 with an opid of "Get" to printing device 112 as a request to get (send) a document "MyDoc" for print server 132a. In response to JOB message 642, printing device 112 can generate and send JOBR message 644 to print server 132a, where message(s) 644 has a data1 value of "Yes" indicating successful completion of the Get request and a data2 value of "D1" where D1 is a copy of the requested "MyDoc" document.

Upon reception of message(s) 644, print server 132a can generate and send JOB message 646 with an opid of "Store" to printing device 114 as a request a file D1 as document named "MyDoc" in a document box for user U1 that resides on printing device 114. Printing device 114 can then save D1 as "MyDoc" in the document box for user U1, thereby replacing the original "MyDoc" for U1 found as part of the search associated with JOB message 610. After saving "MyDoc", printing device 114 can generate and send JOBR message 650 to print server 132a with a data1 value of "Yes" to indicate to print server 132a that the storage request associated with JOB message 646 was successfully completed.

In some scenarios, print server 132a can send JOB message 646 to print server 132b with a devid of 114 so that print server 132b can relay the received JOB message to printing device 114. In related scenarios, printing device 114 can send JOBR message 650 to print server 132b so that print server 132b can relay the received JOBR message to print server 132b.

Upon reception of JOBR message 650, print server 132a can generate and send JOBR message 652 with data1 value of "Yes" to client computing device 116 to indicate that the copy request made using JOB message 640 was successfully completed. As shown in FIG. 6, print server 132a can also carry out the procedures of block 654 to update user accounting data for user U1 to record that user U1 has requested copying of a document from a document box on printing device 112 to a document box on printing device 114.

Scenario 600 continues with user U1 deciding, as shown by block 656 of FIG. 6, to print MyDoc on printing device 114. Subsequently, client computing device 116 can determine that print server 132b is in direct communication with printing device 114, generate and send JOB message 660 to print server 132b to carry out a printing request utilizing printing device 114. FIG. 6 shows that JOB message 660 has a opid of "Print", a devid of 114, a userid of "U1", and a data1 value "MyDoc" to print server 132b, to indicate the printing request is, more specifically, a request to have printing device 114 print a document "MyDoc" that is stored in the document box of user U1 on printing device 114.

Print server 132b then sends JOB message 662 to printing device 114 to carry out the request to print document "MyDoc" stored in the document box of user U1 on printing device 114. Upon reception of JOB message 662, printing device 114 carries out the procedures of block 664 by retrieving document MyDoc from the document box of user U1 and printing the retrieved document MyDoc to paper. Subsequently, printing device 114 generates and sends JOBR message 666 with a data1 value of "Yes" to print server 132b to indicate that printing device 114 successfully printed "MyDoc". Print server 132b then sends JOBR message 668 to print server 132a to indicate that printing device 114 successfully printed "MyDoc". Print server 132b also generates and sends ACCT message 670 to print server 132a to request an "Update" (as specified by the opid of message 670) to a "Print" related accounting (as specified as a second opid of message 670) of user U1 for printing "MyDoc" (as specified as data1 and data2 for message 670). Upon receipt of ACCT message 670, print server 132a can carry out the procedures of block 672 to update user accounting data for user U1 to record that user U1 has requested printing of document "MyDoc" from a document box on printing device 114. As shown in FIG. 6, print server 132a can generate and send ACCTR message 674 to print server 132b with data1 value of "Yes" to indicate that the accounting requested via ACCT message 670 was successfully completed. After print server 132b receives ACCTR message 674, scenario 600 can end.

Figure 7:
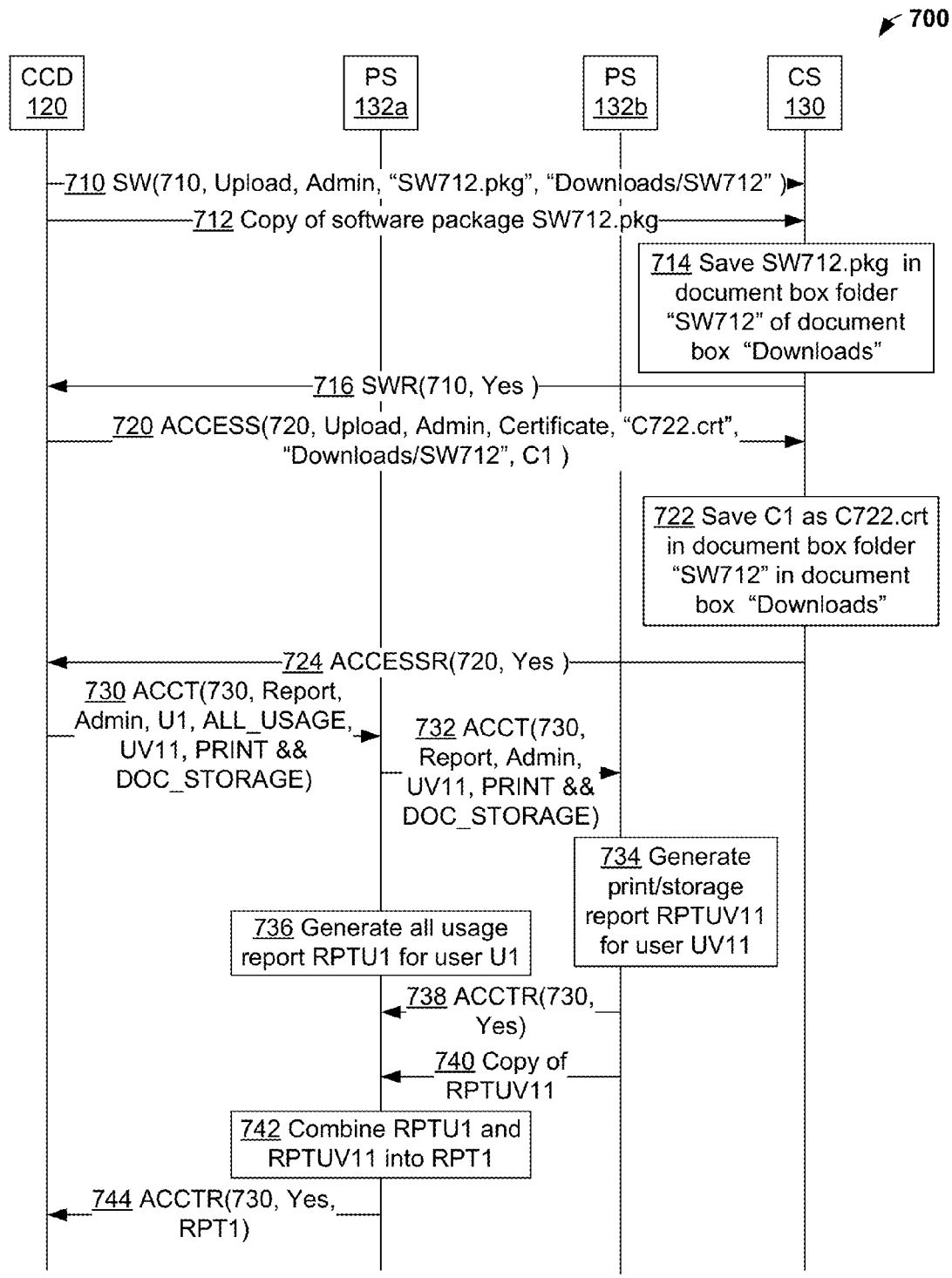
FIG. 7 is a communication flow diagram for another framework-related scenario, according to an example embodiment.

FIG. 7 is a communication flow diagram for scenario 700 related to framework functionality 500 in printing network 100, according to an example embodiment. Scenario 700 relates to uploading software and access credentials to a cloud server and reporting user accounting information.

In scenario 700, controlling computing device 120 initiates a cloud service that involves software transfer 710 on behalf of an administrator "Admin" to load solution software "SW712" onto cloud server 130. Then, controlling computing device 120 initiates a cloud service that involves access-related-data transfer 720 on behalf of Admin to load a certificate named "C722.crt" that is related to accessing SW712 onto cloud server 730. The scenario continues with controlling computing device 120 making accounting related request 730 on behalf of Admin to report usage statistics for a user "U1" associated with print server 132a and a user "UV11" associated with print server 132b. After controlling computing device 120 receives the requested report, scenario 700 can end.

Scenario 700 can begin with controlling computing device 120 sending SW message 710 to cloud server 130. FIG. 7 shows that SW message 710 has a transaction ID of "710", an opid of "Upload" indicating SW message 710 relates to a software transfer from controlling computing device 120 to cloud server 130. In other scenarios, an opid of "Download" can be used for a software transfer from controlling computing device 120 to cloud server 130.

FIG. 7 also shows that SW message 710 has a userid of "Admin" indicating message 710 is associated with administrator "Admin", a data1 value of "SW712.pkg" indicating a file name for the upload to be initiated by SW message 710, and a data2 value of "Downloads/SW712" indicating a file path for storing the uploaded SW712.pkg file. In other embodiments, other identifiers other than file name and file path can be used to specify a name or names of uploaded (downloaded) data, files, access information, and/or other uploaded (downloaded) materials. Controlling computing device 120 can also send one or more messages 712 to cloud server 130, where the message(s) contain a copy of the uploaded SW712.pkg file.

In scenario 700, the uploaded SW712.pkg file is associated with a software package. After receiving message(s) 712, cloud server 130 carries out the procedures of block 714 to save the uploaded SW712.pkg file in a file folder (or file directory) named "SW712" of a document box named "Downloads", where the "Downloads" document box is associated with administrator Admin. After saving the uploaded SW712.pkg file, cloud server 130 can generate and send SWR message 716 to indicate to controlling computing device 120 that the upload initiated by SW message 710 was completed successfully.

Scenario 700 can continue with controlling computing device 120 sending ACCESS message 720 to cloud server 130. FIG. 7 shows that ACCESS message 720 has a transaction ID of "720", an opid of "Upload" indicating ACCESS message 720 relates to a transfer of data related to access credentials from controlling computing device 120 to cloud server 130. In other scenarios, an opid of "Download" can be used for a transfer of data related to access credentials from controlling computing device 120 to cloud server 130.

FIG. 7 also shows that ACCESS message 720 has a userid of "Admin" indicating ACCESS message 720 is associated with administrator "Admin", a data1 value of "Certificate" indicating that data related to access credentials is (includes) one or more certificates, a data2 value of "C722.crt" indicating a file name of C722.crt for the certificate to be uploaded via ACCESS message 720, and a data3 value of "Downloads/SW712" indicating a file path for storing the uploaded C722.crt file, and a data4 value of C1, where C1 is a copy of certificate C722.crt. In other scenarios, controlling computing device 120 can send C1 separately from ACCESS message 720; e.g., in a similar fashion to software package being sent via message(s) 712.

In scenario 700, the uploaded certificate C1 is associated with software package SW712. After receiving ACCESS message 720, cloud server 130 carries out the procedures of block 722 to save the uploaded certificate C1 that was communicated ACCESS message 720 as file "C722.crt" in the file folder (or file directory) named "SW712" of a document box named "Downloads", where the "Downloads" document box is associated with administrator Admin. After saving the uploaded C722.crt file, cloud server 130 can generate and send ACCESSR message 724 to indicate to controlling computing device 120 that the upload carried out via ACCESS message 720 was completed successfully.

Scenario 700 continues with controlling computing device 120 sending ACCT message 730 to print server 132a. FIG. 7 shows that ACCT message 730 has a transaction ID of "730", an opid of "Report" indicating ACCT message 730 relates to reporting accounting information, a userid of "Admin" indicating ACCT message 730 is associated with administrator "Admin", a data1 value of "U1" indicating that the accounting information to be reported is related to a user "U1", a data2 value of "ALL_USAGE" to indicate that a report of accounting information related to U1 is to include a report of all available types of usage information associated with U1, a data3 value of "UV11" indicating that the accounting information to be reported is related to a user "UV11", a data4 value of "PRINT && DOC_STORAGE" to indicate that a report of accounting information related to UV11 is to include a report of printing and document storage usage information associated with UV11.

In scenario 700, accounting data for user U1 is stored in storage of (or associated with) print server 132a and accounting data for user UV11 is stored in storage of (or associated with) print server 132b. Then, upon reception of ACCT message 730, print server 132a can determine that print server 132a can report the requested accounting information for user U1, and that print server 132b should report the requested accounting information for user UV11. Print server 132a can then generate and send ACCT message 732 to print server 132b to request reporting of accounting information for user UV11.

In particular, FIG. 7 shows that ACCT message 732 has a transaction ID of "730", an opid of "Report", a userid of "Admin", a data1 value of "UV11" indicating that the accounting information to be reported is related to user "UV11", and a data2 value of "PRINT && DOC_STORAGE" to indicate that a report of accounting information related to UV11 is to include a report of printing and document storage usage information associated with UV11. Upon reception of ACCT message 732, print server 132b can carry out the procedures of block 734 to generate a report named "RPTUV11" of printing and document storage usage information associated with UV11. After generating report RPTUV11, print server 132b can then generate and send ACCTR message 738 to print server 132a indicate successful completion of the requested reporting of information about UV11, and then send report RPTUV11 to print server 132a via one or more messages 740.

Additionally, print server 132a can carry out the procedures of block 736 to generate a report named "RPTU1" of all usage information associated with U1. Then, after receiving message(s) 740, print server 132a can carry out the procedures of block 742 to combine the accounting information in report RPTU1 for user U1 and the accounting information in report RPTUV11 for user UV11 into a report RPT1. After report RPT1 is generated, print server 132a can generate and send ACCTR message 744 to controlling computing device 120 to both indicate successful completion of the requested reporting of information about users U1 and UV11 and to communicate report RPT1 with the requested accounting information for users U1 and UV11 to controlling computing device 120.

In other scenarios, cloud server 130 can be configured to provide a cloud service for reporting accounting records; e.g., controlling computing device 120 can send ACCT message 730 to cloud server 130, cloud server can send ACCT messages to print servers 132a and 132b to request accounting reports RPTU1 and RPTUV11, combine the RPTU1 and RPTUV11 reports into RPT1, and provide RPT1 to controlling computing device 120 as part of an ACCTR message similar to ACCTR message 744.

After controlling computing device 120 receives ACCTR message 744, scenario 700 can end.

Figure 8:
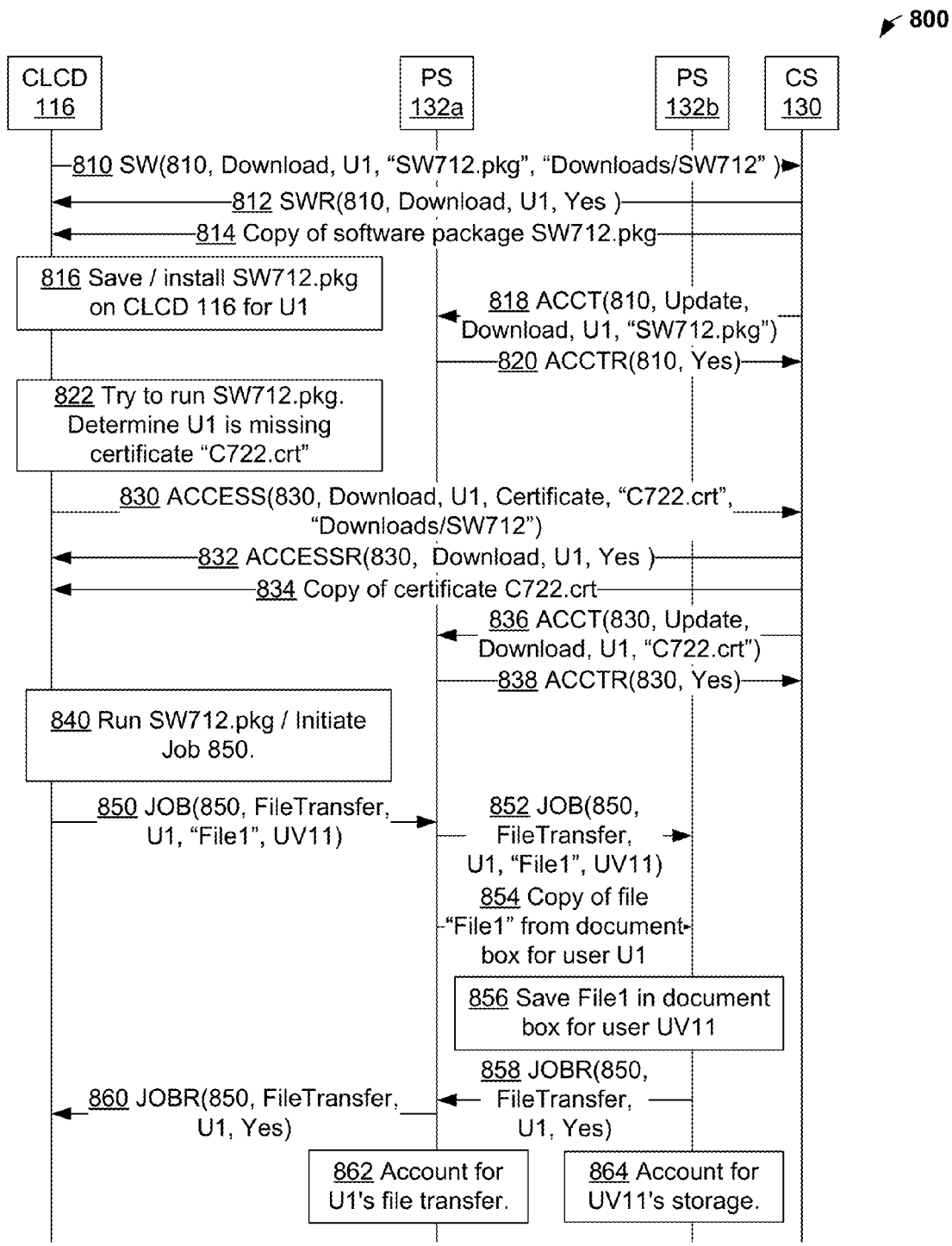
FIG. 8 is a communication flow diagram for another framework-related scenario, according to an example embodiment.

FIG. 8 is a communication flow diagram for scenario 800 related to framework functionality 500 in printing network 100, according to an example embodiment. Scenario 800 relates to downloading software and access credentials from a cloud server and transferring files using the downloaded software.

In scenario 800, client computing device 116 uses SW message 810 to initiate a cloud service that involves software transfer of software "SW712.pkg" from cloud server 130 to client computing device 116 on behalf of a user. Once SW712.pkg is transferred, client computing device 116 installs the software in SW712.pkg and cloud server 130 can instructed print server 132a to update accounting related the download. After installation, client computing device 116 can attempt to execute the software in SW712.pkg and determine that a copy of certificate C722.crt is to be obtained before SW712.pkg can be executed.

Then, client computing device 116 can use ACCESS message 830 to initiate a cloud service that involves requesting C722.crt certificate from cloud server 130, and, in response, cloud server 130 can provide the C722.crt certificate to client computing device 116. After obtaining the C722.crt certificate, client computing device 116 can execute SW712.pkg, which enables file transfer between document boxes of framework-enabled devices. In scenario 800, client computing device 116 can execute SW712.pkg to generate JOB message 850 to transfer a file named "File1" from client computing device 116 to a document box associated with user UV11 on print server 132b using JOB message 850. The file transfer is successfully completed and appropriate accounting data for users U1 and UV11 are updated to account for the file transfer.

Scenario 800 can begin with client computing device 116 generating and sending SW message 810 to print server 132a. FIG. 8 shows that SW message 810 has a transaction ID of "810", an opid of "Download" can be used for a software transfer from cloud server 130 to client computing device 116, a userID of "U1" indicating the software transfer is for/on behalf of user U1, a data1 value of "SW712.pkg" indicating a file name for the download initiated by SW message 810, and a data2 value of "Downloads/SW712" indicating a file path on cloud server 130 to retrieve the SW712.pkg file for downloading.

After receiving SW message 810, cloud server 130 can retrieve the requested SW712.pkg file and generate and send SWR message 812 to indicate to client computing device 116 that the download initiated by SW message 810 was completed successfully. Cloud server 130 can also send one or more messages 814 to client computing device 116, where the message(s) contain a copy of the SW712.pkg file being downloaded. In other scenarios, the SW712.pkg file can be sent as part of SWR message 812. Cloud server 130 can also generate and send ACCT message 818 to print server 132a to request that accounting records for user U1 be updated to reflect the download of the "SW712.pkg" file; in response, print server 132a can generate and send ACCTR message 820 indicating a successful update of accounting records for user U1.

After receiving message(s) 814, client computing device 116 carries out the procedures of block 816 to save the downloaded SW712.pkg file. Then, client computing device 116 carries out the procedures of block 822 to attempt execution of the software in the SW712.pkg file. In scenario 800, user U1/client computing device 116 can determine that certificate C722.crt is to be obtained before SW712.pkg can be executed by client computing device 116.

FIG. 8 shows that scenario 800 continues with client computing device 116 sending ACCESS message 830 to cloud server 130, with ACCESS message 830 having a transaction ID of "830", an opid of "Download" indicating ACCESS message 830 relates to a transfer of data related to access credentials from cloud server 130 to client computing device 116, a userid of "U1" indicating ACCESS message 830 is associated with user U1, a data1 value of "Certificate" indicating that data related to access credentials is (includes) one or more certificates, a data2 value of "C722.crt" indicating a file name of C722.crt for the certificate to be downloaded via ACCESS message 830, and a data3 value of "Downloads/SW712" indicating a file path for retrieving the C722.crt file for download.

After receiving ACCESS message 830, cloud server 130 can retrieve the file for certificate "C722.crt" from the file folder (or file directory) named "SW712" of a document box named "Downloads". After retrieving the C722.crt file, cloud server 130 can generate and send ACCESSR message 832 to indicate to client computing device 116 that the download requested via ACCESS message 830 was completed successfully.

Cloud server 130 can also send one or more messages 834 to client computing device 116, where the message(s) contain a copy of the C722.crt file being downloaded. In other scenarios, the C722.crt file can be sent as part of ACCESSR message 832. Cloud server 130 can also generate and send ACCT message 836 to print server 132a to request that accounting records for user U1 be updated to reflect the download of the "C722.crt" file; in response, print server 132a can generate and send ACCTR message 838 indicating a successful update of accounting records for user U1.

Scenario 800 continues with client computing device 116 receiving the C722.crt certificate/file, and subsequently user U1 decides to run the SW712.pkg software with the intent of transferring a file "File1" from a document box on print server 132a that is associated with user U1 to a document box on print server 132b that is associated with user U11. In the context of scenario 800, client computing device 116, using the SW712.pkg software, generates and sends JOB message 850 to print server 132a.

As shown in FIG. 8, JOB message 850 has a transid of "850", an opid of "FileTransfer" indicating a file transfer is an operation to be initiated by JOB message 850, a userid of U1, a data1 value of "File1" indicating the name of a source file to be transferred and a data2 value of "UV11" indicating (indirectly) that a document box associated with user UV11 is a destination of the file transfer. In other scenarios, JOB message 850 can have additional data value(s) to indicate a source document box name, a destination document box name, file path(s)/folder name(s) in the source and/or destination document box, and/or a destination file name for the file being transferred. In even other scenarios, JOB message 850 can have additional data value(s) to specify a file transfer involving multiple source files, and therefore multiple destination files. In still other scenarios, locations of source and/or destination files and/or mailboxes can be specified using different data values than indicated in scenario 800; e.g., files and/or mailboxes can be specified as URLs, URIs, or using other resource/file location techniques.

In even other scenarios, the SW712.pkg software can utilize cloud server 130 to perform/coordinate the file transfer as a cloud service. That is, SW712.pkg software can generate and sends JOB message 850 to cloud server 130, which can then send one or more messages to a source device storing a source file to obtain the source file; e.g., cloud server 130 sends message(s) to print server 132a to obtain a copy of "File1" from user U1's document box. Then, cloud sever 130 can send the copy of File1 to print server 132b for storage in user UV11's document box to complete the transfer. In particular of these scenarios, cloud sever 130 can send any necessary ACCT messages to request user accounting by print server 132a and/or 132b as discussed below in the context of blocks 862 and 864.

After receiving JOB message 850, print server 132a can forward a copy of message 850 as JOB message 852 to print server 132b to inform print server 132b about the file transfer. Print server 132a can also send one or more messages 854 to client computing device 116, where the message(s) contain a copy of the File1 file being transferred. In other scenarios, print server 132a can attach a copy of the File1 file to JOB message 852 rather than sending message(s) 854 to print server 132b.

Upon reception of message(s) 854, print server 132b can carry out the procedures of block 856 to save File1 in (a default location of) a document box associated with user UV11. Print server 132b can then generate and send JOBR message 858 to print server 132a to indicate successful completion of the file transfer. Print server 132b also can carry out the procedures of block 864 to update accounting records for user UV11 to indicate storage allocated for the transferred file File1.

Upon reception of JOBR message 858, print server 858 can forward message 858 as JOBR message 860 to client computing device 116 to indicate successful completion of the file transfer. Print server 132b also can carry out the procedures of block 862 to update accounting records for user U1 related to the file transfer. After JOBR message 860 is received by client computing device 116 and the procedures of blocks 862 and 864 are completed, scenario 800 can end.

Figure 9:
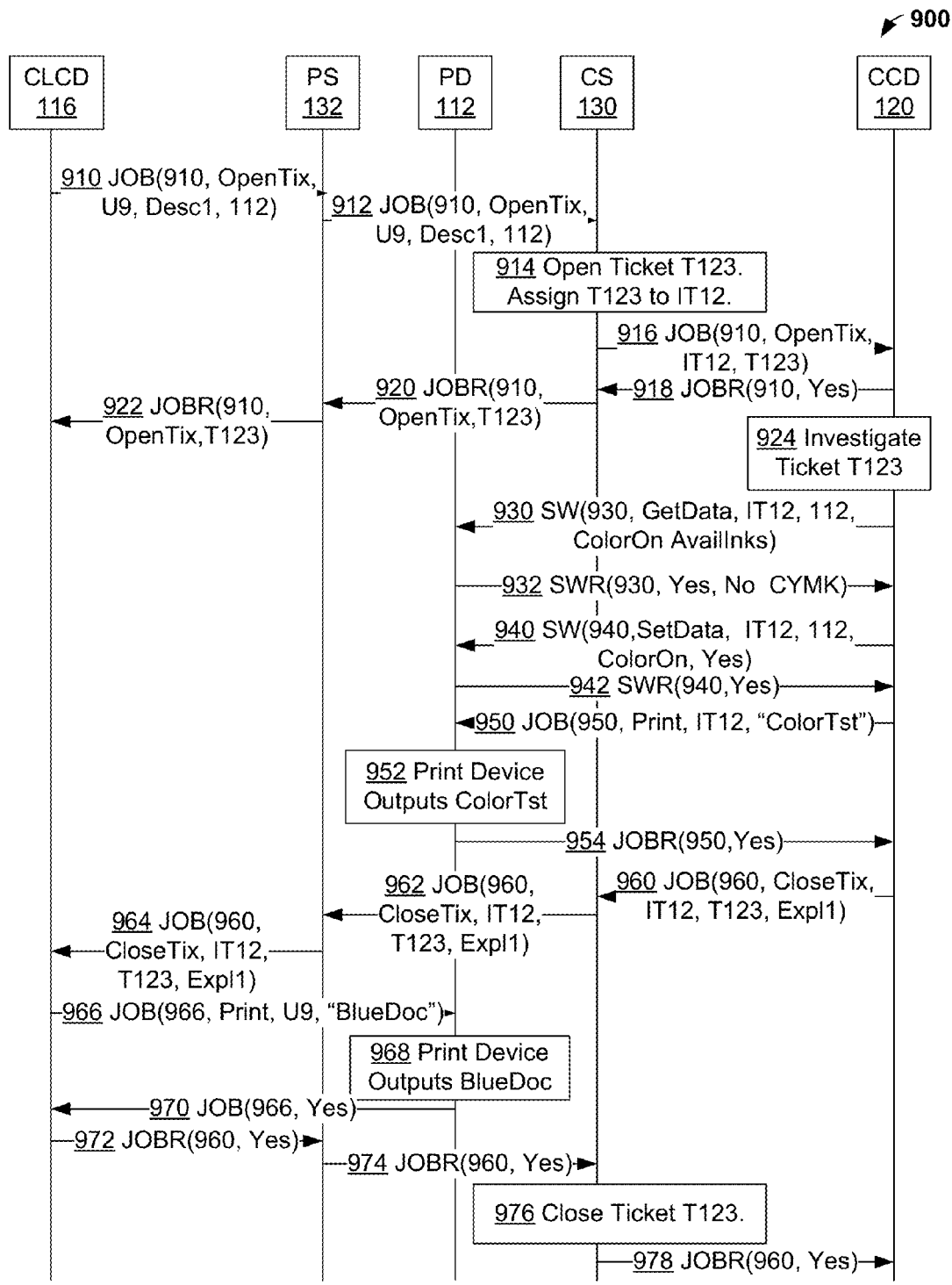
FIG. 9 is a communication flow diagram for another framework-related scenario, according to an example embodiment.

FIG. 9 is a communication flow diagram for scenario 900 related to framework functionality 500 in printing network 100, according to an example embodiment. Scenario 900 relates to reporting and resolving problems with printing-related devices in printing network 100 using framework functionality 500 to provide a cloud service for reporting problems.

Scenario 900 begins with user U9 using client computing device 116 to send a request to open a trouble ticket for printing device 112 using a trouble-ticketing cloud service, where a problem with printing device 112 is described using problem description Desc1 ("can't print in color on PD112"). The trouble ticket is forwarded from print server 132 to cloud server 130. Cloud server 130 consequently opens a trouble ticket T123, assigns the trouble ticket to IT Specialist IT12, and informs IT12 by sending JOB message 916 to controlling computing device 116.

IT Specialist IT12 accepts the ticket as indicated by JOBR message 918, investigates the problem as described by Desc1, and sends SW message 930 to printing device 112 to request data, which is provided via SWR message 932. After reviewing the data provided in SWR message 932, IT Specialist IT12 changes some of the data on printing device 112 using SW message 940, and then sends a test document "ColorTst" to printing device 112 for printing. Printing device 112 prints the ColorTst document to paper.

After reviewing the paper version of the ColorTst document generated by printing device 112, IT Specialist IT12 sends JOB message 960 to cloud server 130 to request closure of ticket T123 with explanation Expl1 ("Enabled color printing, Test of color printing on PD 112 successful—see attached.") that includes an electronic copy of the ColorTst output provided by printing device 112. Cloud server 130 passes the request on to user U9 via print server 132. User U9 then prints their own document "BlueDoc" on printing device 112, determines the printed output of Blue-Doc is correct, and sends JOBR message 972 agreeing to close trouble ticket T123. The trouble ticket is closed by cloud server 120. After IT Specialist is informed of the ticket closure, scenario 900 ends.

As shown in FIG. 9, scenario 900 begins with user U9 using a trouble-ticketing cloud service partially operating on client computing device 116 to generate and send JOB message 910 to print server 132 requesting opening a trouble ticket to report a problem user U9 has with printing device 112. JOB message 910 includes a transid of "910", an opid of "OpenTix" requesting opening of a trouble ticket, a userid of "U9" to indicate association of JOB message 910 with user U9, a data1 value of "Desc1", which is a problem description explaining U9's problem with printing device 112 ("can't print in color on PD112"), and a data2 value of "112" indicating the device that is the subject of the trouble ticket. Upon reception of JOB message 910, print server 132 forwards the received message as JOB message 912 to cloud server 130.

After receiving JOB message 912, cloud server 130 uses the procedures of block 914 to open a trouble ticket identified as trouble ticket T123 and assigns trouble ticket T123 to IT Specialist IT12. Once trouble ticket T123 is assigned, cloud server 130 sends JOB message 916 regarding the open trouble ticket to controlling computing device 120, which is associated with (used by) IT Specialist IT12. JOB message 916 includes a transid of "910", an opid of "OpenTix", a userid of "IT12" indicating that trouble ticket T123 was assigned to IT Specialist IT12, and data1 value of "T123" that includes a copy of the trouble ticket T123.

Scenario 900 continues with IT Specialist IT12 accepting trouble ticket T123 using functionality of the trouble-ticketing cloud service (e.g., management tool(s) 122) installed on controlling computing device 120, and instructing controlling computing device 120 to generate and send JOBR message 918 indicating the acceptance of trouble ticket T123 to cloud server 130.

After receiving JOBR message 918, cloud server 130 sends JOBR message 920 that includes a data1 value with a copy of trouble ticket T123 to print server 132, which in turn forwards the received message as JOBR message 922 to client computing device 116 to inform user U9 about the opening of trouble ticket T123.

As shown in FIG. 9, scenario 900 continues with IT Specialist IT12 carrying out the procedures of block 924 to investigate the problem described by Desc1 and trouble ticket T123. After investigating the problem, IT Specialist IT12 uses controlling computing device 120 to send SW message 930 to request data from printing device 112. SW message 930 includes a transid "930", an opid of "GetData" to indicate a request for data, a userid of "IT12" indicating IT Specialist IT12's associating (origination) of the request, a devid of "112" to indicate the request is directed to printing device 112, and a data1 value of "ColorOn AvailInks" to indicate that two data values being requested—a value of a "ColorOn" parameter and a value of an "AvailInks" parameter.

After receiving SW message 930, printing device 112 can obtain the requested values of the ColorOn and AvailInks parameters and provide those values via SWR message 932. SWR message 932 includes a data1 value of "Yes" indicating successful completion of the data request, and a data2 value of "No CYMK". The first value, "No", of data2 is for first requested parameter value; e.g., the ColorOn parameter value, to indicate that color printing is inhibited on printing device 112. The second value, "CYMK", of data2 is for the second requested parameter value; e.g., the AvailInks parameter value, to indicate that printing device 112 has Cyan, Yellow, Magenta, and blacK (CYMK) colored inks.

As such, IT Specialist IT12 can use the data provided by SWR message 932 to determine that printing device 112 has color inks but has color printing inhibited, and so determine that allowing color printing might solve trouble ticket T123. To allow color printing on printing device 112, IT Specialist IT12 can use controlling computing device 120 to send SW message 940 to set the ColorOn parameter to "Yes", and so enable color printing on printing device 112. As shown in FIG. 9, SW message 940 includes a transid "940", an opid of "SetData" to indicate a request to set data value(s), a userid of "IT12" indicating IT Specialist IT12's associating (origination) of the request, a devid of "112" to indicate the request is directed to printing device 112, a data1 value of "ColorOn" to indicate that the ColorOn parameter is requested to be modified, and a data2 value of "Yes" to indicate the requested new value of the "ColorOn" parameter. After receiving SW message 940, printing device 112 can set the requested value of the ColorOn parameter to Yes, as requested, and provide confirmation of the changed ColorOn parameter value via sending a data1 value of "Yes" in SWR message 942.

After receiving SWR message 942, IT Specialist IT12 can use controlling computing device 120 to generate and send JOB message 950 to printing device 112 to request printing to paper of a test document "ColorTst" by the printing device 112. After receiving JOB message 950, printing device 112 prints the ColorTst document to paper using the procedures of block 952, and sends JOBR message 954 to controlling computing device 120 as an indication of successful printing of the ColorTst document. Scenario 900 continues with IT Specialist IT12 reviewing the paper version of the ColorTst document generated by printing device 112 and determining that color printing is now enabled on printing device 112, and so the problem leading to trouble ticket T123 has been solved.

IT Specialist IT12 then uses functionality of the trouble-ticketing cloud service on controlling computing device 120 to generate and send JOB message 960 to cloud server 130 to request closure of ticket T123. As shown in FIG. 9, JOB message 960 includes a transid of "960", an opid of "CloseTix" to request closure of a trouble ticket, a userid of "IT12" to indicate association (origination) of the request with IT Specialist IT12, a data1 value of "T123" to indicate the trouble ticket requested to be closed, and a data2 value of explanation "Expl1" that explains why the trouble ticket should be closed; e.g., Expl1 can read "Enabled color printing, Test of color printing on PD 112 successful—see attached." and include an electronic copy of the ColorTst output provided by printing device 112 at block 952.

In scenario 900, trouble tickets are closed only after the originating user agrees to close the trouble ticket. Therefore, cloud server 130 passes JOB message 960 on to print server 132 as JOB message 962, to request authorization to close trouble ticket T123. Print server 132 then passes on the JOB message as JOB message 964 on to client computing device 116 and, therefore, to user U9. To verify that the problem with printing device 112 is resolved, user U9 requests printing of a document "BlueDoc" to paper by printing device 112 using JOB message 966. After receiving JOB message 966, printing device 112 prints the BlueDoc document to paper using the procedures of block 968, and sends JOBR message 970 to client computing device 116 indicating successful printing of the ColorTst document.

Scenario 900 continues with user U9 reviewing the paper version of the BlueDoc document generated by printing device 112 to confirm that color printing is now enabled on printing device 112, and so the problem leading to trouble ticket T123 has been solved. User U9 uses functionality of the trouble-ticketing cloud service on client computing device 120 to generate and send JOBR message 972 to print server 132 indicating agreement to close trouble ticket T123. As shown in FIG. 9, JOBR message 972 has a transid of "960", which is the transaction requesting closure of trouble ticket T123, and a data1 value of "Yes" indicating agreement to close trouble ticket T123. Print server then forwards on JOBR message 972 as JOBR message 974 to cloud server 130. Upon reception of JOBR message 974, cloud server 130 can close trouble ticket T123 using the procedures of block 976. After carrying out block 976, cloud server 130 can forward the received JOBR message as JOBR message 978 to controlling computing device 120 to inform IT Specialist IT12 of closure of T123. Upon reception of JOBR message 978 by controlling computing device 120, scenario 900 can end.

V. Example Methods of Operation

Figure 10:
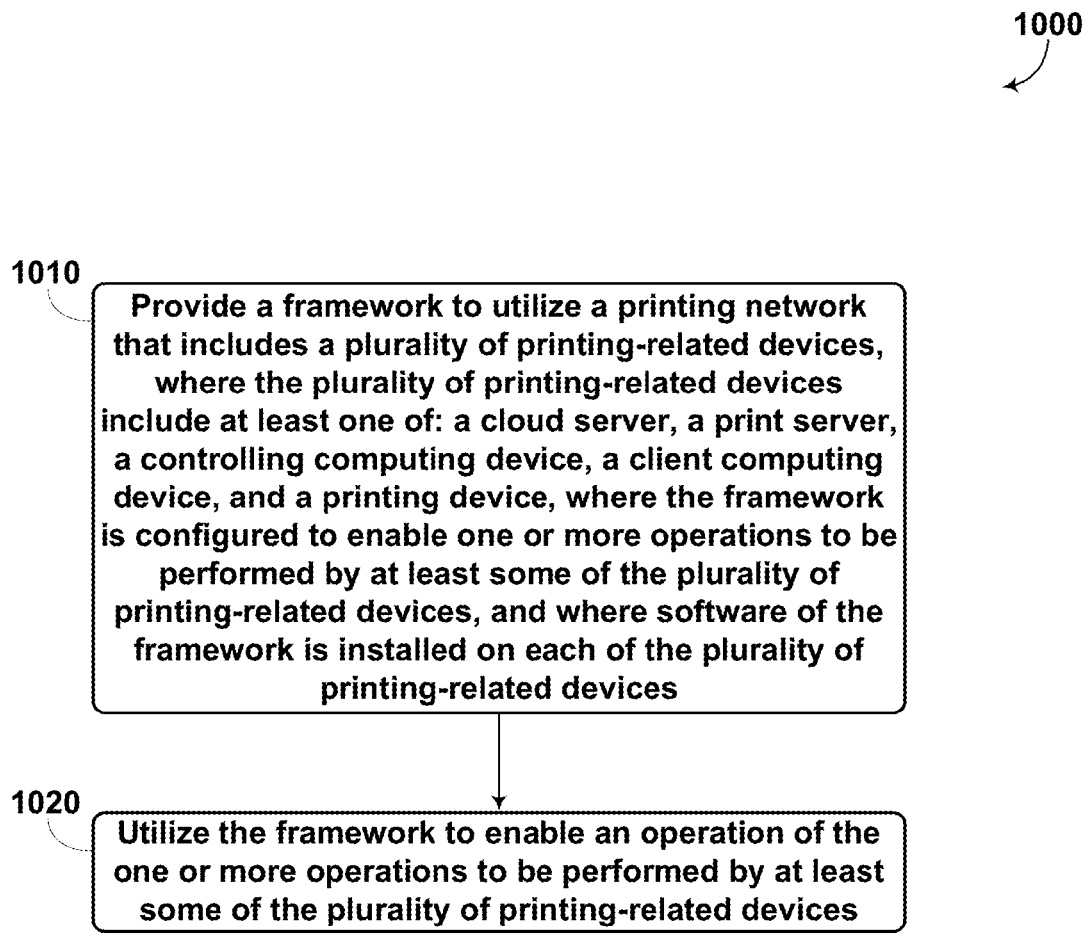
FIG. 10 shows a flowchart for a method, according to an example embodiment.

FIG. 10 shows a flowchart for method 1000, according to an example embodiment. Method 1000 can begin at block 1010, where a framework can be provided. The framework can utilize a printing network. The printing network can include a plurality of printing-related devices, where the plurality of printing-related devices can include at least one of: a cloud server, a print server, a controlling computing device, a client computing device, and a printing device. The framework can be configured to enable one or more operations to be performed by at least some of the plurality of printing-related devices. Software of the framework can be installed on each of the plurality of printing-related devices. Such a framework is discussed above at least in the context of FIGS. 1 and 3-9.

In some embodiments, the controlling computing device can be configured to execute at least controlling-tool software and client software, where the controlling-tool software and the client software are each part of the software of the framework, where the controlling-tool software is configured to administer at least some of the plurality of printing-related devices, and where the client software is configured to perform functions related to at least one of: a client to synchronize documents and/or addresses with one or more cloud services, an agent for a printing device, one or more extensions for enabling access control and accounting of user operations on the controlling computing device, such as discussed above at least in the context of FIG. 4.

In other embodiments, the software of the framework can include a plurality of adaptors, where each adaptor can be configured to operate on a printing-related device of the plurality of printing-related devices to enable the printing-related device to communicate using the printing network to perform the one or more operations, such as discussed above at least in the context of FIG. 4. In particular of these embodiments, the plurality of adaptors can include: a cloud-service adaptor configured to be executed on the cloud server, a print-server adaptor configured to be executed on the print server, a controlling-tool adaptor configured to be executed on the controlling computing device, a client adaptor configured to be executed on the client computing device; and a printing-device adaptor configured to be executed on the printing device, such as discussed above at least in the context of FIG. 4.

At block 1020, the framework can be utilized to enable an operation of the one or more operations to be performed by at least some of the plurality of printing-related devices, as discussed above at least in the context of FIGS. 1 and 3-9. In some embodiments, the one or more operations can include at least one of: an operation related to device utilization, an operation related to device settings, an operation related to device configuration, an operation related to device usage assessment, an operation related to device optimization, an operation related to job accounting, an operation related to access management, an operation related to solution management, an operation related to servicing and maintaining printing devices, and an operation related to network connectivity, such as discussed above at least in the context of FIG. 5.

In other embodiments, utilizing the framework to enable the operation of the one or more operations comprises utilizing the framework to perform a cloud service that includes connecting the cloud server with one or more of the plurality of printing-related devices, such as discussed above at least in the context of FIGS. 7-9.

In still other embodiments, the printing network further comprises a client computing device. Then, the one or more operations can include: adding data associated with the client computing device to the framework, retrieving data associated with the client computing device from the framework, verifying authentication data from the client computing device based on the user data associated with the client computing device, determining that one or more printing devices in the printing network are accessible to the client computing device via the framework, and moving data between the one or more printing devices in the printing network, such as discussed above at least in the context of FIG. 5.

In particular of the still other embodiments, a printing device can be configured with a document box, address book and device accounting storage. The document box, address book and device accounting storage can be configured to store one or more documents, contacts, usage and usage limits. Then, the one or more operations can include at least one of: an operation initiating printing of a document of the one or more documents using a printing device of the one or more printing devices in the printing network, an operation initiating scanning of a document of the one or more documents using a printing device of the one or more printing devices in the printing network, an operation of manipulating the document using a document service that executes on the cloud server, and an operation of accounting for one or more print/scan jobs, such as discussed above at least in the context of FIG. 5.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
   providing a framework to utilize a printing network that comprises a plurality of printing-related devices, wherein the plurality of printing-related devices include at least one of: a cloud server, a print server, a controlling computing device, a client computing device, and a printing device, wherein the framework is configured to enable one or more operations to be performed by at least some of the plurality of printing-related devices, and wherein software of the framework is installed on each of the plurality of printing-related devices;
   utilizing the framework to transfer software to at least one printing-related device of the plurality of printing-related devices, wherein the transferred software enables the at least one printing-related device to utilize the framework to perform a particular operation of the one or more operations;
   utilizing the framework to update one or more accounting records indicating that the at least one printing-related device received the transferred software; and
   utilizing the framework and the software transferred to the at least one printing-related device to perform the particular operation.

2. The method of claim 1, wherein the software of the framework comprises a plurality of adaptors, and wherein each adaptor is configured to operate on a printing-related device of the plurality of printing-related devices to enable the printing-related device to communicate using the printing network to perform the one or more operations by at least converting a device-independent communication into a device-specific communication and vice versa, wherein the at least one printing-related device is configured to process the device-specific communication to perform the one or more operations.

3. The method of claim 2, wherein the plurality of adaptors comprise:
   a cloud-service adaptor configured to be executed on the cloud server,
   a print-server adaptor configured to be executed on the print server,
   a controlling-tool adaptor configured to be executed on the controlling computing device,
   a client adaptor configured to be executed on the client computing device; and
   a printing-device adaptor configured to be executed on the printing device.

4. The method of claim 1, wherein utilizing the framework to transfer software to the at least one printing-related device comprises utilizing the framework to perform a cloud service that includes connecting a cloud server with the at least one printing-related device to transfer a certificate to the at least one printing-related device, wherein the certificate is associated with the transferred software, and wherein the at least one printing-related device obtains the certificate before the transferred software is enabled to be executed by the particular printing-related device.

5. The method of claim 1, wherein the one or more operations comprise at least one of: an operation related to device utilization, an operation related to device settings, an operation related to device configuration, an operation related to device usage assessment, an operation related to device optimization, an operation related to job accounting, an operation related to access management, an operation related to solution management, an operation related to servicing and maintaining printing devices, and an operation related to network connectivity.

6. The method of claim 1, wherein the printing network further comprises a client computing device, and wherein the one or more operations comprise: adding data associated with the client computing device to the framework, retrieving data associated with the client computing device from the framework, verifying authentication data from the client computing device based on the user data associated with the client computing device, determining that one or more printing devices in the printing network are accessible to the client computing device via the framework, and moving data between the one or more printing devices in the printing network.

7. The method of claim 6, wherein a printing device is configured with a document box, address book storage, and device accounting storage that are configured to store one or more documents, contacts, usage and usage limits, wherein the document box is configured to provide access to least one document stored in the document box by at least one device other than the printing device, and wherein the one or more operations comprise at least one of: an operation initiating printing of a document of the one or more documents using a printing device of the one or more printing devices in the printing network, an operation initiating scanning of a document of the one or more documents using a printing device of the one or more printing devices in the printing network, an operation of manipulating the document using a document service that executes on the cloud server, and an operation of accounting for one or more print/scan jobs.

8. A system, comprising:
   a plurality of printing-related devices that include at least one of: a cloud server, a print server, a controlling computing device, a client computing device, and a printing device and that comprise:

a particular printing-related device, comprising:
  one or more processors; and
  data storage configured to store computer-readable instructions that, when executed by the one or more processors, cause the particular printing-related device to perform functions comprising:
    providing a framework to utilize a printing network that comprises the plurality of printing-related devices, wherein the framework is configured to enable one or more operations to be performed by at least some of the plurality of printing-related devices, and wherein software of the framework is installed on each of the plurality of printing-related devices;
    utilizing the framework to transfer software to the particular printing-related device, wherein the transferred software enables the particular printing-related device to utilize the framework to perform a particular operation of the one or more operations;
    utilizing the framework to update one or more accounting records indicating that the particular printing-related device received the transferred software; and
    utilizing the framework and the software transferred to the at least one printing-related device to perform the particular operation.

9. The system of claim 8, wherein the software of the framework comprises a plurality of adaptors, wherein each adaptor is configured to operate on a printing-related device of the plurality of printing-related devices to enable the printing-related device to communicate using the printing network to perform the one or more operations by at least converting a device-independent communication into a device-specific communication and vice versa, wherein the particular printing-related device is configured to process the device-specific communication to perform the one or more operations.

10. The system of claim 9, wherein the plurality of adaptors comprise:
  a cloud-service adaptor configured to be executed on the cloud server,
  a print-server adaptor configured to be executed on the print server,
  a controlling-tool adaptor configured to be executed on the controlling computing device,
  a client adaptor configured to be executed on the client computing device; and
  a printing-device adaptor configured to be executed on the printing device.

11. The system of claim 8, wherein utilizing the framework to transfer software to the particular printing-related device comprises utilizing the framework to perform a cloud service that includes connecting a cloud server with the particular printing-related device to transfer a certificate to the at least one printing-related device, wherein the certificate is associated with the transferred software, and wherein the at least one printing-related device obtains the certificate before the transferred software is enabled to be executed by the particular printing-related device.

12. The system of claim 8, wherein the one or more operations comprise at least one of: an operation related to device utilization, an operation related to device settings, an operation related to device configuration, an operation related to device usage assessment, an operation related to device optimization, an operation related to job accounting, an operation related to access management, an operation related to solution management, an operation related to servicing and maintaining printing devices, and an operation related to network connectivity.

13. The system of claim 8, wherein the printing network further comprises a client computing device, and wherein the one or more operations comprise: adding data associated with the client computing device to the framework, retrieving data associated with the client computing device from the framework, verifying authentication data from the client computing device based on the user data associated with the client computing device, determining that one or more printing devices in the printing network are accessible to the client computing device via the framework, and moving data between the one or more printing devices in the printing network.

14. The system of claim 13, wherein a printing device is configured with a document box, address book and device accounting storage configured to store one or more documents, contacts, usage and usage limits, wherein the document box is configured to provide access to least one document stored in the document box by at least one device other than the printing device, and wherein the one or more operations comprise at least one of: an operation initiating printing of a document of the one or more documents using a printing device of the one or more printing devices in the printing network, an operation initiating scanning of a document of the one or more documents using a printing device of the one or more printing devices in the printing network, an operation of manipulating the document using a document service that executes on the cloud server, and an operation of accounting for one or more print/scan jobs.

15. An article of manufacture including computer-readable instructions that, when executed by one or more processors of a particular printing-related device of a plurality of printing-related devices, cause the particular printing-related device to perform functions comprising:
  providing a framework to utilize a printing network that comprises the plurality of printing-related devices, wherein the plurality of printing-related devices include at least one of: a cloud server, a print server, a controlling computing device, a client computing device, and a printing device, wherein the framework is configured to enable one or more operations to be performed by at least some of the plurality of printing-related devices, and wherein software of the framework is installed on each of the plurality of printing-related devices;
  utilizing the framework to transfer software to the particular printing-related device, wherein the transferred software enables the particular printing-related device to utilize the framework to perform a particular operation of the one or more operations;
  utilizing the framework to update one or more accounting records indicating that the particular printing-related device received the transferred software; and
  utilizing the framework and the software transferred to the at least one printing-related device to perform the particular operation.

16. The article of manufacture of claim 15, wherein the software of the framework comprises a plurality of adaptors, wherein each adaptor is configured to operate on a printing-related device of the plurality of printing-related devices to enable the printing-related device to communicate using the printing network to perform the one or more operations by at least converting a device-independent communication into a device-specific communication and vice versa, wherein the particular printing-related device is configured to process the device-specific communication to perform the one or more operations.

17. The article of manufacture of claim 16, wherein the plurality of adaptors comprise:
   a cloud-service adaptor configured to be executed on the cloud server,
   a print-server adaptor configured to be executed on the print server,
   a controlling-tool adaptor configured to be executed on the controlling computing device,
   a client adaptor configured to be executed on the client computing device; and
   a printing-device adaptor configured to be executed on the printing device.

18. The article of manufacture of claim 15, wherein utilizing the framework to transfer software to the particular printing-related device comprises utilizing the framework to perform a cloud service that includes connecting a cloud server the particular printing-related device to transfer a certificate to the at least one printing-related device, wherein the certificate is associated with the transferred software, and wherein the at least one printing-related device obtains the certificate before the transferred software is enabled to be executed by the particular printing-related device.

19. The article of manufacture of claim 15, wherein the one or more operations comprise at least one of: an operation related to device utilization, an operation related to device settings, an operation related to device configuration, an operation related to device usage assessment, an operation related to device optimization, an operation related to job accounting, an operation related to access management, an operation related to solution management, an operation related to servicing and maintaining printing devices, and an operation related to network connectivity.

20. The article of manufacture of claim 15, wherein the printing network further comprises a client computing device, and wherein the one or more operations comprise: adding data associated with the client computing device to the framework, retrieving data associated with the client computing device from the framework, verifying authentication data from the client computing device based on the user data associated with the client computing device, determining that one or more printing devices in the printing network are accessible to the client computing device via the framework, and moving data between the one or more printing devices in the printing network.

* * * * *